(12) United States Patent
Komon et al.

(10) Patent No.: US 10,875,978 B2
(45) Date of Patent: Dec. 29, 2020

(54) TEMPLATE-ASSISTED PRODUCTION OF POROUS MATERIALS

(71) Applicant: American Aerogel Corporation, Rochester, NY (US)

(72) Inventors: Zachary J. A. Komon, San Diego, CA (US); Michael D. Wyrsta, Santa Barbara, CA (US)

(73) Assignee: American Aerogel Corporation, Rochester, NY (US)

(*) Notice: Subject to any disclaimer, the term of this patent is extended or adjusted under 35 U.S.C. 154(b) by 0 days.

(21) Appl. No.: 15/305,961

(22) PCT Filed: Apr. 23, 2015

(86) PCT No.: PCT/US2015/027398
§ 371 (c)(1),
(2) Date: Oct. 21, 2016

(87) PCT Pub. No.: WO2015/164673
PCT Pub. Date: Oct. 29, 2015

(65) Prior Publication Data
US 2017/0058093 A1 Mar. 2, 2017

Related U.S. Application Data

(60) Provisional application No. 62/015,340, filed on Jun. 20, 2014, provisional application No. 61/982,932, filed on Apr. 23, 2014.

(51) Int. Cl.
| | | |
|---|---|---|
| *C08J 9/35* | (2006.01) | |
| *C08J 9/36* | (2006.01) | |
| *C08J 9/28* | (2006.01) | |
| *C08J 9/40* | (2006.01) | |
| *B29C 65/02* | (2006.01) | |
| *B29L 31/00* | (2006.01) | |

(52) U.S. Cl.
CPC .............. *C08J 9/35* (2013.01); *B29C 65/02* (2013.01); *C08J 9/286* (2013.01); *C08J 9/405* (2013.01); *B29L 2031/7128* (2013.01); *C08J 2201/048* (2013.01); *C08J 2201/05* (2013.01); *C08J 2205/05* (2013.01); *C08J 2323/06* (2013.01); *C08J 2323/12* (2013.01); *C08J 2361/06* (2013.01); *C08J 2461/06* (2013.01)

(58) Field of Classification Search
CPC . C08J 9/35; C08J 9/405; C08J 2361/06; C08J 9/286; C08J 2461/06; C08J 2201/048; C08J 2323/12; C08J 2323/06; C08J 2201/05; C08J 2205/05; C08J 2423/12; C08J 2423/06; B29C 65/02; B29L 2031/7128
See application file for complete search history.

(56) References Cited

U.S. PATENT DOCUMENTS

| | | | |
|---|---|---|---|
| 3,269,887 A | 8/1966 | Windecker et al. | |
| 4,402,927 A | 9/1983 | von Dardel et al. | |
| 4,610,863 A | 9/1986 | Tewari et al. | |
| 4,873,218 A | 10/1989 | Pekala | |
| 5,019,260 A | 5/1991 | Gsell et al. | |
| 5,037,859 A | 8/1991 | Williams et al. | |
| 5,476,878 A | 12/1995 | Pekala | |
| 5,556,892 A | 9/1996 | Pekala | |
| 5,945,084 A | 8/1999 | Droege | |
| 7,521,485 B2 * | 4/2009 | Albert .................. | C04B 35/524 502/416 |
| 7,977,411 B2 | 7/2011 | Williams et al. | |
| 8,071,657 B2 | 12/2011 | Albert et al. | |
| 8,436,061 B2 | 5/2013 | Albert et al. | |
| 8,691,883 B2 | 4/2014 | Cho et al. | |
| 9,056,961 B2 * | 6/2015 | Steinke ..................... | C08J 9/32 |
| 2009/0029147 A1 * | 1/2009 | Tang ....................... | B32B 27/40 428/319.1 |

FOREIGN PATENT DOCUMENTS

| | | |
|---|---|---|
| CN | 102363669 | 2/2012 |
| EP | 2397513 | 12/2011 |
| WO | WO 02/074842 | 9/2002 |

OTHER PUBLICATIONS

Definition of "Solvent" from Hawley's condensed chemical dictionary. Mar. 2007. (Year: 2007).*
Communication enclosing extended European Search Report dated Aug. 18, 2017 in EP Application No. 15782535.7.
International Preliminary Report on Patentability dated Nov. 3, 2016 in International Patent Application No. PCTUS2015/027398.
International Search Report and Written Opinion dated Jul. 8, 2015 in International Patent Application No. PCT/US2015/027398.
Materials Research Society Bulletin, vol. 15, No. 12, Dec. 1990, pp. 1-68.
Pekala et al., "Low-Density, Microcellular Materials", In Lawrence Livermore National Labs Materials, Science Bulletin UCRL-TB-117598-37, Dec. 1990, pp. 1.
Ma et al., "Mechanical Structure-Property Relationship of Aerogels", In the Journal of Non-Crystalline Solids, vol. 277, May 2000, pp. 127-141.
Lu et al., "Thermal and Electrical Conductivity of Monolithic Carbon Aerogels", In the Journal of Applied Physics, vol. 73, No. 2, Jan. 15, 1993, pp. 581-584.
Pekala et al., "Organic Aerogels: Microstructural Dependence of Mechanical Properties in Compression", In the Journal of Non-Crystalline Solids, vol. 125, May 1990, pp. 67-75.
Office Action dated Apr. 9, 2018 in EP Patent Application No. 15782535.7.

(Continued)

*Primary Examiner* — Kara B Boyle
(74) *Attorney, Agent, or Firm* — Byrne Poh LLP; Nina R. Horan

(57) ABSTRACT

The present disclosure provides composites comprising an open cell foam and a small pore area material, methods for their preparation, articles of manufacture comprising them and methods for preparing the same.

16 Claims, No Drawings

(56) References Cited

OTHER PUBLICATIONS

Office Action dated Nov. 27, 2018 in CN Patent Application No. 201580028150.6.
Examination Report dated Sep. 20, 2018 in EP Patent Application No. 15782535.7.
Office Action dated Jan. 6, 2020 in BR Patent Application No. 1120160248058.
Office Action dated Dec. 5, 2019 in EP Patent Application No. 15782535.7.
Office Action dated Mar. 20, 2020 in CN Patent Application No. 201580028150.6, pp. 1-8.
Office Action dated Sep. 25, 2019 in CN Patent Application No. 201580028150.6, pp. 1-10.

* cited by examiner

TEMPLATE-ASSISTED PRODUCTION OF POROUS MATERIALS

BACKGROUND

Porous materials, such as small pore area materials, are known and have been used in a variety of applications, including, but not limited to, thermal barriers and insulation, acoustical barriers and insulation, electrical and electronic components, shock and impact isolators, and chemical applications. See, e.g., U.S. Pat. Nos. 4,832,881; 7,005,181; 7,521,485; 8,071,657; and 8,436,061; Materials Research Society, vol. 15, no. 12 (December 1990); and Lawrence Livermore National Labs Materials, Science Bulletin UCRL-TB-117598-37. The usefulness of any particular foam depends on certain properties, including, but not limited to, bulk density, bulk size, cell or pore structure, and/or strength. See, e.g., "Mechanical Structure-Property Relationship of Aerogels," Journal of Non-Crystalline Solids, vol. 277, pp. 127-41 (2000); "Thermal and Electrical Conductivity of Monolithic Carbon Aerogels," Journal of Applied Physics, vol. 73 (2), 15 Jan. 1993; "Organic Aerogels: Microstructural Dependence of Mechanical Properties in Compression," Journal of Non-Crystalline Solids, vol. 125, pp. 67-75 (1990). For example, density affects, among other things, a foam's solid thermal conductivity, mechanical strength (elastic modulus), and sound velocity. In general, lowering the density of a foam will also lower its solid thermal conductivity, elastic modulus, and longitudinal sound velocity. However, a foam's density cannot be too low otherwise it will not satisfy the mechanical stability of its intended application.

Other important properties, at least for purposes of commercialization, include ease and flexibility of manufacture, for example, the ability to withstand the stresses that typically exist during manufacture (e.g., vacuum bagging), and the ability to make foams having a broad range of properties, sizes and shapes.

Porous monoliths are typically made using well-known "sol-gel" processes. The term "sol" is used to indicate a dispersion of a solid in a liquid. The term "gel" is used to indicate a chemical system in which one component provides a sufficient structural network for rigidity, and other components fill the spaces between the structural units. The term "sol-gel" is used to indicate a capillary network formed by interlinked, dispersed solid particles of a sol, filled by a liquid component.

The preparation of foams by such known sol-gel processes generally involves two steps. In the first step, the precursor chemicals are mixed together and allowed to form a sol-gel under ambient conditions, or, more typically, at temperatures higher than ambient. In the second step, commonly referred to as the "drying step," the liquid component of the sol-gel is removed. See, e.g., U.S. Pat. Nos. 4,610,863; 4,873,218; and 5,476,878. See also, U.S. Pat. Nos. 7,005,181; 7,521,485; 8,071,657; and 8,436,061.

Known methods for preparing sol-gels have several problems. For example, during the known methods, the poured gel mix must remain still, because any movement may disrupt the gelation thereby rendering the monolith useless. In addition, the poured gel mix must be maintained in a fluid-tight, individually packaged container during cure.

Moreover, mold-cast monoliths, prior to solvent removal, have significant associated shrinkage, reducing yield and further complicating targeted product size. In addition, the mold-cast months have significant associated excess fluid and polymeric material that needs disposal or treatment. Further, drying methodologies can cause significant stresses that lead to warping, cracking, bulging and other defects that significantly reduce yield.

Another problem with known sol-gel processes is that the produced monoliths are friable and dusty. In addition, mold-cast monoliths have large surface imperfections and are therefore produced in large sizes that are then cut down to the desired size, creating substantial waste, including kerf waste, and reducing utilization efficiency.

SUMMARY OF THE DISCLOSURE

The present disclosure provides composites comprising an open cell foam and a small pore area material, methods for their preparation, articles of manufacture comprising them and methods for preparing the same.

In a particular embodiment, the present disclosure provides a composite comprising (a) an open cell foam; and (b) a small pore area material.

In another embodiment, the present disclosure provides a method for preparing a composite comprising an open cell foam and a small pore area material, the method comprising: (a) providing an open cell foam; (b) forming a solution comprising a hydroxylated aromatic, an electrophilic linking agent, and a carboxylic acid; (c) combining the solution from step (b) with the open cell foam; (d) allowing the solution to form a sol-gel; and (e) removing substantially all of the fluid portion of the sol-gel.

In another embodiment, the present disclosure provides an article of manufacture comprising: (a) an open cell foam as described herein; and (b) a bag.

In another embodiment, the present disclosure provides an article of manufacture comprising: (a) a composite as described herein; and (b) a bag.

In another embodiment, the present disclosure provides a method for preparing an article of manufacture, wherein the method comprises the step(s): (a) placing an open cell foam inside a bag, wherein the open cell foam is as described herein; (b) optionally evacuating the bag; and (c) optionally sealing the bag.

In another embodiment, the present disclosure provides a method for preparing an article of manufacture, wherein the method comprises the step(s): (a) placing a composite as described herein inside a bag; (b) optionally evacuating the bag; and (c) optionally sealing the bag.

DETAILED DESCRIPTION

The invention includes the following:
(1). A composite comprising:
  (a) an open cell foam; and
  (b) a small pore area material.
(2.) The composite according to the above (1.), wherein the open cell foam comprises phenol-aldehyde.
(3.) The composite according to the above (1.), wherein the open cell foam comprises a polymer selected from polyethylene or polypropylene.
(4.) The composite according to any of the above (1.) to (3.), wherein the open cell foam further comprises a strengthening agent.
(5.) The composite according to the above (4.), wherein the strengthening agent is a polymer.
(6.) The composite according to the above (5.), wherein the polymer is selected from the group consisting of polyurethane, polystyrene, epoxides, polyesters, thermosets, resol resins, and other thermoplastics.

(7.) The composite according to any of the above (1.) to (6.), wherein the open cell foam further comprises an opacifier.

(8.) The composite according to the above (7.), wherein the opacifier is an infrared opacifier.

(9.) The composite according to the above (8.), wherein the opacifier is selected from the group consisting of carbon black, graphite, graphene, lampblack, carbospheres, activated carbon, carbon nanotubes, nanodiamonds, silica fibers, spheres or balloons, gold and silver nanoparticles and nanowires, quantum dots, and dyes such as Gentex absorber dyes (Filtron A series), titanium dioxide and a powdered pore area material.

(10.) The composite according to claim (8.), wherein the opacifier is carbon black.

(11.) The composite according to the above (8.), wherein the opacifier is a powdered pore area material.

(12.) The composite according to any one of the above (1.) to (11.), wherein the open cell foam further comprises carbon black and polyurethane.

(13.) The composite according to any one of the above (1.) to (11.), wherein the open cell foam further comprises (a) powdered pore area material and (b) polyurethane.

(14.) The composite according to any of the above (1.) to (13.), wherein the small pore area material comprises a hydroxylated aromatic; a solvent comprising a carboxylic acid; and an electrophilic linking agent.

(15.) The composite according to the above (14.), wherein the carboxylic acid is selected from the group consisting of acetic acid, formic acid, propionic acid, butyric acid, pentanoic acid, and isomers thereof.

(16.) The composite according to the above (14.) or (15.), wherein the carboxylic acid is acetic acid.

(17.) The composite according to the above (14.), wherein the hydroxylated aromatic is a hydroxylated benzene compound.

(18.) The composite according to the above (14.) or (17.), wherein the hydroxylated aromatic comprises a phenolic-novolak resin or phenolic-resole resin.

(19.) The composite according to the above (14.), wherein the electrophilic linking agent comprises an aldehyde.

(20.) The composite according to the above (14.) or (19.), wherein the electrophilic linking agent comprises furfural.

(21.) The composite according to any of the above (14.), (19.) or (20.), wherein the electrophilic linking agent comprises alcohol.

(22.) The composite according to the above (21.), wherein the alcohol is furfuryl alcohol.

(23.) The composite according to any of the above (14.) to (22.), wherein the hydroxylated aromatic is selected from the group consisting of phenol, resorcinol, catechol, hydroquinone, phloroglucinol and liquid phenolic resins.

(24.) The composite according to any of the above (14.) to (23.), wherein the electrophilic linking agent is selected from the group consisting of formaldehyde, 1,3,5 trioxane, and paraformaldehyde.

(25.) The composite according to any of the above (14.) to (24.), wherein the small pore area material is a low density microcellular material.

(26.) The composite according to any of the above (1.) to (25.), further comprising an agent selected from the group consisting of metal powders, metal oxides, metal salts, silica, alumina, aluminosilicates, carbon black, novoloid fibers and fire resistant additives.

(27.) A method for preparing a composite comprising an open cell foam and a small pore area material, the method comprising:

(a) providing an open cell foam;
(b) forming a solution comprising a hydroxylated aromatic, an electrophilic linking agent, and a carboxylic acid;
(c) combining the solution from step (b) with the open cell foam;
(d) allowing the solution to form a sol-gel; and
(e) removing substantially all of the fluid portion of the sol-gel.

(28.) The method according to the above (27.), wherein the open cell foam comprises phenol.

(29.) The method according to the above (27.), wherein the open cell foam comprises a polymer selected from polyethylene or polypropylene.

(30.) The method according to any of the above (27.) to (29.), wherein the small pore area material comprises a hydroxylated aromatic; a solvent comprising a carboxylic acid; and an electrophilic linking agent.

(31.) The method according to the above (30.), wherein the carboxylic acid is selected from the group consisting of acetic acid, formic acid, propionic acid, butyric acid, pentanoic acid, and isomers thereof.

(32.) The method according to the above (30.) or (31.), wherein the carboxylic acid is acetic acid.

(33.) The method according to the above (30.), wherein the hydroxylated aromatic is a hydroxylated benzene compound.

(34.) The method according to the above (30.) or (33.), wherein the hydroxylated aromatic comprises a phenolic-novolak resin.

(35.) The method according to the above (30.), wherein the electrophilic linking agent comprises an aldehyde.

(36.) The method according to the above (30.) or (35.), wherein the electrophilic linking agent is selected from the group consisting of formaldehyde, 1,3,5 trioxane, and paraformaldehyde.

(37.) The method according to any of the above (30.), (35.) or (36.), wherein the electrophilic linking agent comprises alcohol.

(38.) The method according to the above (37.), wherein the alcohol is furfuryl alcohol.

(39.) The method according to any of the above (30.) to (38.), wherein the hydroxylated aromatic is selected from the group consisting of phenol, resorcinol, catechol, hydroquinone, phloroglucinol and liquid phenolic resins.

(40.) The method according to any of the above (30.) to (38.), wherein the electrophilic linking agent comprises formaldehyde.

(41.) The method according to any of the above (30.) to (40.), wherein the small pore area material is a low density microcellular material.

(42.) The method according to any of the above (30.) to (41.), wherein the solution formed in step (b) further comprises a catalyzing agent.

(43.) The method according to the above (42.), wherein the catalyzing agent is a hard acid having a pKa less than 1.

(44.) The method according to the above (42.) or (43.), wherein the catalyzing agent is selected from the group consisting hydrochloric acid, sulfuric acid and hydrobromic acid.

(45.) The method according to the above (30.), wherein step (d) includes the substep of subjecting said solution to either: (i) a temperature or a pressure higher than ambient; or (ii) a temperature and a pressure higher than ambient.

(46.) The method according to the above (30.), wherein step (e) includes the substep of evaporating said fluid portion at ambient conditions.

(47.) The method according to the above (30.), further including the substep of subjecting said fluid portion to either: (i) higher than ambient temperatures or lower than ambient pressures; or (ii) higher than ambient temperatures and lower than ambient pressures.

(48.) The method according to the above (30.), wherein step (e) is substantially accomplished by subjecting said sol-gel to centrifugation.

(49.) The method according to the above (30.), wherein step (e) is substantially accomplished by subjecting said sol-gel to freeze drying.

(50.) The method according to the above (30.), wherein step (e) is substantially accomplished by subjecting said sol-gel to a gas pressure differential across said sol-gel.

(51.) The method according to the above (30.), wherein step (e) is substantially accomplished by supercritical extraction of said sol-gel.

(52.) An article of manufacture comprising:
(a) an open cell foam as defined in any one of the above (2.) to (25.); and
(b) a bag.

(53.) An article of manufacture comprising:
(a) the composite of any one of the above (1.) to (26.); and
(b) a bag.

(54.) The article of manufacture of the above (52.) or (53.), wherein the bag comprises PET, BOPP (biaxially oriented polypropylene), PVDC, LLDPE, HDPE or Nylon 11.

(55.) The article of manufacture of the above (52.) or (53.), wherein the bag comprises a laminate.

(56.) The article of manufacture of the above (55.), wherein the bag comprises PET laminated to Nylon 11.

(57.) The article of manufacture of any one of the above (52.) to (56.), wherein the bag comprises a metalized layer.

(58.) The article of manufacture of the above (57.), wherein the metalized layer comprises aluminum.

(59.) The article of manufacture of any one of the above (52.) to (58.), wherein the bag comprises an oxide layer.

(60.) The article of manufacture of the above (59.), wherein the oxide layer comprises silicon dioxide.

(61.) The article of manufacture of any one of the above (52.) to (60.), wherein the bag is sealable.

(62.) The article of manufacture of the above (61.), wherein the bag is heat sealable.

(63.) The article of manufacture of the above (61.), wherein the bag is sealed with an adhesive.

(64.) The article of manufacture of any one of the above (52.) to (63.), comprising substantially no air.

(65.) The article of manufacture of any one of the above (52.) to (64.), comprising a low thermal conductivity gas.

(66.) The article of manufacture of the above (65.), wherein the low thermal conductivity gas is $SO_2$, Freon-12, Xe or Kr.

(67.) The article of manufacture of any one of the above (52.) to (66.), further comprising a desiccant.

(68.) The article of manufacture of the above (67.), wherein the desiccant comprises CaO, $CaSO_4$, silica, or zeolite.

(69.) The article of manufacture of any one of the above (52.) to (68.), further comprising a getter.

(70.) The article of manufacture of the above (69.), wherein the getter comprises calcium oxide, calcium sulfate, copper sulfate, silica, alumina, molecular sieves or zeolites.

(71.) A method for preparing an article of manufacture, wherein the method comprises the step:
(a) placing an open cell foam inside a bag, wherein the open cell foam is as defined in any one of the above (2.) to (25.).

(72.) A method for preparing an article of manufacture, wherein the method comprises the step:
(a) placing the composite of any one of the above (1.) to (26.) inside a bag.

(73.) The method of the above (71.) or (72.), further comprising the steps:
(b) evacuating the bag; and
(c) sealing the bag.

(74.) The method of the above (73.), wherein step (b) comprises the substep of adding a low thermal conductivity gas to the bag.

(75.) The method of the above (74.), wherein the low thermal conductivity gas is $SO_2$, Freon-12 or xenon.

(76.) The method of the above (74.) or (75.), wherein step (b) comprises the substep of re-evacuating the bag.

(77.) The method of any one of the above (71.) to (76.), wherein step (c) comprises heat sealing.

(78.) The method of any one of the above (71.) to (77.), wherein the bag comprises PET, BOPP (biaxially oriented polypropylene), PVDC, LLDPE, HDPE or Nylon 11.

(79.) The method of any one of the above (71.) to (78.), wherein the bag comprises a laminate.

(80.) The method of any one of the above (71.) to (79.), wherein the bag comprises a metalized layer.

(81.) The method of the above (80.), wherein the metalized layer comprises aluminum.

(82.) The method of any one of the above (71.) to (81.), wherein the bag comprises an oxide layer.

(83.) The method of the above (82.), wherein the oxide layer comprises silicon dioxide.

Definitions

Unless defined otherwise, all technical and scientific terms used herein have the same meaning as those commonly understood by one of ordinary skill in the art to which this invention belongs. Although methods and materials similar or equivalent to those described herein can be used in the practice or testing of the present invention, suitable methods and materials are described below. The materials, methods and examples are illustrative only, and are not intended to be limiting. All publications, patents and other documents mentioned herein are incorporated by reference in their entirety.

Throughout this specification, the word "comprise" or variations such as "comprises" or "comprising" will be understood to imply the inclusion of a stated integer or groups of integers but not the exclusion of any other integer or group of integers.

The term "a" or "an" may mean more than one of an item.

The terms "and" and "or" may refer to either the conjunctive or disjunctive and mean "and/or".

The term "about" means within plus or minus 10% of a stated value. For example, "about 100" would refer to any number between 90 and 110.

The term "open cell foam" is a type of foam in which greater than about 50% of the cells are open and/or interconnected by pores on the cell walls. Pore size can range in size from 1 nm to 100 um. Examples of open cell foams include floral foam, pressed silica, polyurethane-based foams, eva foams, polyesters, epoxide foams, vinyl-based foams, wood (e.g. balsa) and cellulosic foams.

The term "small pore area material" (abbreviated as "SPM") is a type of foam, which may be thought of as a dispersion of gas bubbles within a liquid, solid or gel (see IUPAC Compendium of Chemical Terminology (2d ed. 1997)). Specifically, and as used herein, an SPM is a foam having a density of less than about 1000 kilograms per cubic meter ($kg/m^3$) and a small pore structure in which the average pore area is less than about 500 $\mu m^2$.

The term "large pore area material" is a type of foam having a density of about 0.04 kg/m³ to about 0.3 kg/m³ and a pore structure in which the average pore area is greater than about 8×10⁵ um². In one embodiment, the large pore area material has a density of about 0.07 kg/m³ to about 0.12 kg/m³. In another embodiment, the large pore area material has a density of about 0.1 kg/m³.

The term "medium pore area material" is a type of foam having a density of about 0.04 kg/m³ to about 0.3 kg/m³ and a pore structure in which the average pore area is from about 500 um² to about 8×10⁵ um². In one embodiment, the medium pore area material has a density of about 0.07 kg/m³ to about 0.12 kg/m³. In another embodiment, the large pore area material has a density of about 0.1 kg/m³.

"Average pore area," as used herein, is the average of the pore areas of at least the 20 largest pores identified by visual examination of images generated by scanning electron microscopy ("SEM"). These pore areas can be measured with the use of ImageJ software, available from NIH.

The term a low density microcellular material ("LDMM") is one type of SPM. Specifically, and as used herein, an LDMM is an SPM having a microcellular structure in which the average pore diameter is less than about 1000 nanometers (nm) which is determined by measuring the average pore area and then calculating the average pore diameter by using the formula: area=$4\pi r^2$. For example, an average pore area of 3.14 μm² corresponds to an average pore diameter of 1000 nm.

The term "aerogel" is a type of LDMM (and thus it is also an SPM) in which gas is dispersed in an amorphous solid composed of interconnected particles that form small, interconnected pores.

As used herein, the term SPM is intended to encompass LDMMs and aerogels. Thus, a reference to the SPMs of this invention includes, but is not limited to, LDMMs and aerogels. Similarly, the term LDMM is intended to encompass aerogels. Thus, a reference to the LDMMs of this invention includes, but is not limited to, aerogels.

The term "powdered pore area material" refers to the pore area material prepared by crushing, grinding, pulverizing, sanding or otherwise manipulating a solid pore area material. The solid pore area material can be a large pore area material, a medium pore area material or a small pore area material. In one embodiment, the solid pore area material is an LDMM. In another embodiment, the solid pore area material is an aerogel. In certain embodiments, the powdered pore area material is prepared from a material disclosed in U.S. Pat. Nos. 7,005,181; 7,521,485; 8,071,657; and 8,436,061.

As used herein, the term "high density open-celled phenol-aldehyde foam" refers to an open cell foam comprising phenol-aldehyde and having a density from about 50 kg/m³ to about 190 kg/m³.

The phrase "substantially no air" in the bag means that there may be absolutely no air in the bag or that there may be some amount of air in the bag as long as the amount is within a range that does not impair the insulating properties of the open cell foam or composite of the disclosure.

Composites of the Disclosure

The present disclosure provides composites comprising an open cell foam and a small pore area material. Advantageously, the composites of the present disclosure are rigid monolithic materials. The rigidity allows the composites to be able to withstand vacuum bagging and subsequently assembled into a box having good insulation properties. In contrast, known forms of VIP insulation typically use powders as their insulation material, which, once evacuated in a bag, can deform causing poor edge quality, thus making a box having poor insulation properties.

In one embodiment, the open cell foam comprises phenol-aldehyde. In another embodiment, the open cell foam comprises a high density open-celled phenol-aldehyde foam. In another embodiment, the open cell foam comprises a polymer selected from polyethylene or polypropylene.

In embodiments in which the open cell foam comprises phenol-aldehyde, the aldehyde can be any aldehyde. Suitable aldehydes include, but are not limited to, furfuraldehyde, 1,3,5-trioxane, paraformaldehyde, formaldehyde, glyoxal, benzaldehyde, ethanal, propanal, and butanal. In one embodiment, the aldehyde is furfuraldehyde. In another embodiment, the aldehyde is 1,3,5-trioxane. In one embodiment, the aldehyde is paraformaldehyde. In another embodiment, the aldehyde is formaldehyde. In another embodiment, the aldehyde is glyoxal. In another embodiment, the aldehyde is benzaldehyde. In another embodiment, the aldehyde is ethanal. In another embodiment, the aldehyde is propanal. In another embodiment, the aldehyde is butanal.

In one embodiment, the open cell foam comprises a phenol-formaldehyde foam. In another embodiment, the open cell foam comprises a high density open-celled phenol-formaldehyde foam.

In one embodiment, the open cell foam further comprises a foam additive to vary the properties of the final composite. Foam additives that can be used include, but are not limited to, strengthening agents, such as colloidal materials, fibers, wires and the like, opacifiers, such as infrared opacifiers, getters, such as calcium oxide, water and oxygen scavengers, such as metal powders and anhydrous materials CaO, Silica, zeolites like 3A, 4A, calcium sulfate and the like.

Opacifiers are known in the art and any can be used. In some embodiments, the opacifier is an infrared opacifier. In some embodiments, the opacifier is absorptive. In other embodiments, the opacifier is reflective. In some embodiments, the absorptive infrared opacifier is selected carbon black, a powdered pore area material, graphite, graphene, lampblack, carbospheres, activated carbon, carbon nanotubes, nanodiamonds, silica fibers, spheres or balloons, gold and silver nanoparticles and nanowires, quantum dots, or dyes such as Gentex absorber dyes (Filtron A series). In other embodiments, the reflective infrared opacifier is titanium dioxide.

In some embodiments, the open cell foam comprises a strengthening agent. Useful strengthening agents include, but are not limited to, a polymer, for example, polyurethane, polystyrene, epoxides, polyesters, thermosets, resol resins, and other thermoplastics.

In embodiments in which the open cell foam comprises an additive, the additive may be on the foam or in the foam.

In one embodiment, the open cell foam further comprises a strengthening agent. In another embodiment, the strengthening agent is a polymer. In another embodiment, the strengthening agent is a polymer selected from the group consisting of polyurethane, polystyrene, epoxides, polyesters, thermosets, resol resins, and other thermoplastics.

In one embodiment, the open cell foam further comprises an opacifier. In another embodiment, the open cell foam comprises an infrared opacifier. In another embodiment, the opacifier is selected from the group consisting of metal oxides, nonmetal oxides, metal powders, e.g., aluminum powder, carbon black, graphite, graphene, lampblack, carbospheres, activated carbon, carbon nanotubes, diamond, nanodiamonds, silica fibers, spheres or balloons, gold and silver nanoparticles and nanowires, quantum dots, organic dyes, dye pigments and dyes such as Gentex absorber dyes (Filtron A series), titanium dioxide, a powdered pore area material, and and combinations thereof. In another embodiment, the opacifier is carbon black. In another embodiment, the opacifier is a powdered pore area material. In another embodiment, the opacifier is a powdered large pore area material. In another embodiment, the opacifier is a powdered medium large pore area material. In another embodiment, opacifier is a powdered small pore area material. In one embodiment, the opacifier is a powdered LDMM. In another embodiment, the opacifier is a powdered aerogel. In one embodiment, the opacifier is a powdered material disclosed in U.S. Pat. Nos. 7,005,181; 7,521,485; 8,071,657; and 8,436,061.

In one embodiment, the open cell foam further comprises carbon black and polyurethane.

In one embodiment, the open cell foam further comprises (a) a powdered pore area material and (b) polyurethane.

In one embodiment, the open cell foam comprises phenol-aldehyde and a strengthening agent. In another embodiment, the open cell foam comprises a high density open-celled phenol-aldehyde foam and a strengthening agent. In another embodiment, the open cell foam comprises a phenol-formaldehyde foam and a strengthening agent. In another embodiment, the open cell foam comprises a high density open-celled phenol-formaldehyde foam and a strengthening agent. In another embodiment, the open cell foam comprises a polymer selected from polyethylene or polypropylene and a strengthening agent.

In one embodiment, the open cell foam comprises phenol-aldehyde and an opacifier. In another embodiment, the open cell foam comprises a high density open-celled phenol-aldehyde foam and an opacifier. In another embodiment, the open cell foam comprises a phenol-formaldehyde foam and an opacifier. In another embodiment, the open cell foam comprises a high density open-celled phenol-formaldehyde foam and an opacifier. In another embodiment, the open cell foam comprises polyethylene or polypropylene and an opacifier.

In another embodiment, the open cell foam comprises a strengthening agent and an opacifier. In another embodiment, the open cell foam comprises phenol-aldehyde, a strengthening agent and an opacifier. In another embodiment, the open cell foam comprises a high density open-celled phenol-aldehyde foam, a strengthening agent and an opacifier. In another embodiment, the open cell foam comprises a phenol-formaldehyde foam, a strengthening agent and an opacifier. In another embodiment, the open cell foam comprises a high density open-celled phenol-formaldehyde foam, a strengthening agent and an opacifier. In another embodiment, the open cell foam comprises polyethylene or polypropylene, a strengthening agent and an opacifier. In another embodiment, the open cell foam comprises phenol-aldehyde, a strengthening agent and an opacifier, wherein the strengthening agent is a polymer. In another embodiment, the open cell foam comprises polyethylene or polypropylene, a strengthening agent and an opacifier, wherein the strengthening agent is a polymer. In another embodiment, the open cell foam comprises phenol-aldehyde, a strengthening agent and an opacifier, wherein the strengthening agent is a polymer selected from the group consisting of polyurethane, polystyrene, epoxides, polyesters, thermosets, resol resins, and other thermoplastics. In another embodiment, the open cell foam comprises polyethylene or polypropylene, a strengthening agent and an opacifier, wherein the strengthening agent is a polymer selected from the group consisting of polyurethane, polystyrene, epoxides, polyesters, thermosets, resol resins, and other thermoplastics.

In one embodiment, the open cell foam comprises an infrared opacifier. In another embodiment, the open cell foam comprises phenol-aldehyde and an infrared opacifier. In another embodiment, the open cell foam comprises polyethylene or polypropylene and an infrared opacifier. In another embodiment, the open cell foam comprises a strengthening agent and an infrared opacifier. In another embodiment, the open cell foam comprises phenol-aldehyde, a strengthening agent and an infrared opacifier. In another embodiment, the open cell foam comprises polyethylene or polypropylene, a strengthening agent and an infrared opacifier. In another embodiment, the open cell foam comprises phenol-aldehyde, a strengthening agent and an infrared opacifier, wherein the strengthening agent is a polymer. In another embodiment, the open cell foam comprises polyethylene or polypropylene, a strengthening agent and an infrared opacifier, wherein the strengthening agent is a polymer. In another embodiment, the open cell foam comprises phenol-aldehyde, a strengthening agent and an infrared opacifier, wherein the strengthening agent is a polymer selected from the group consisting of polyurethane, polystyrene, epoxides, polyesters, thermosets, resol resins, and other thermoplastics. In another embodiment, the open cell foam comprises polyethylene or polypropylene, a strengthening agent and an infrared opacifier, wherein the strengthening agent is a polymer selected from the group consisting of polyurethane, polystyrene, epoxides, polyesters, thermosets, resol resins, and other thermoplastics.

In one embodiment, the open cell foam comprises carbon black and polyurethane. In another embodiment, the open cell foam comprises phenol-aldehyde, carbon black and polyurethane. In another embodiment, the open cell foam comprises a high density open-celled phenol-aldehyde foam, carbon black and polyurethane. In another embodiment, the open cell foam comprises a phenol-formaldehyde foam, carbon black and polyurethane. In another embodiment, the open cell foam comprises a high density open-celled phenol-formaldehyde foam, carbon black and polyurethane. In another embodiment, the open cell foam comprises polyethylene or polypropylene, carbon black and polyurethane.

In one embodiment, the open cell foam comprises a powdered pore area material and polyurethane. In another embodiment, the open cell foam comprises phenol-aldehyde, a powdered pore area material and polyurethane. In another embodiment, the open cell foam comprises a high density open-celled phenol-aldehyde foam, a powdered pore area material and polyurethane. In another embodiment, the open cell foam comprises a phenol-formaldehyde foam, a powdered pore area material and polyurethane. In another embodiment, the open cell foam comprises a high density open-celled phenol-formaldehyde foam, a powdered pore area material and polyurethane. In another embodiment, the open cell foam comprises polyethylene or polypropylene, a powdered pore area material and polyurethane.

In one embodiment, the small pore area material comprises a hydroxylated aromatic; a solvent comprising a carboxylic acid; and an electrophilic linking agent. In another embodiment, the small pore area material comprises a hydroxylated aromatic; a solvent comprising a carboxylic acid selected from the group consisting of acetic acid, formic acid, propionic acid, butyric acid, pentanoic acid, and isomers thereof; and an electrophilic linking agent. In one embodiment, the small pore area material comprises a hydroxylated aromatic; a solvent comprising acetic acid; and an electrophilic linking agent.

In one embodiment, the small pore area material comprises a hydroxylated aromatic, wherein the hydroxylated aromatic is a hydroxylated benzene compound; a solvent comprising a carboxylic acid; and an electrophilic linking agent. In another embodiment, the small pore area material comprises a hydroxylated aromatic, wherein the hydroxylated aromatic comprises a phenolic-novolak resin or phenolic-resole resin; a solvent comprising a carboxylic acid; and an electrophilic linking agent. In another embodiment, the small pore area material comprises a hydroxylated aromatic, wherein the hydroxylated aromatic is selected from the group consisting of phenol, resorcinol, catechol, hydroquinone, phloroglucinol and liquid phenolic resins; a solvent comprising a carboxylic acid; and an electrophilic linking agent.

In one embodiment, the small pore area material comprises a hydroxylated aromatic; a solvent comprising a carboxylic acid; and an electrophilic linking agent, wherein the electrophilic linking agent comprises an aldehyde. In another embodiment, the small pore area material comprises a hydroxylated aromatic; a solvent comprising a carboxylic acid; and an electrophilic linking agent, wherein the electrophilic linking agent comprises furfural. In another embodiment, the small pore area material comprises a hydroxylated aromatic; a solvent comprising a carboxylic acid; and an electrophilic linking agent, wherein the electrophilic linking agent comprises alcohol. In another embodiment, the small pore area material comprises a hydroxylated aromatic; a solvent comprising a carboxylic acid; and an electrophilic linking agent, wherein the electrophilic linking agent comprises furfuryl alcohol. In another embodiment, the small pore area material comprises a hydroxylated aromatic; a solvent comprising a carboxylic acid; and an electrophilic linking agent, wherein the electrophilic linking agent is selected from the group consisting of formaldehyde, 1,3,5 trioxane, and paraformaldehyde.

In one embodiment, the small pore area material is a low density microcellular material.

In another embodiment, the small pore area material is a low density microcellular material, the small pore area material comprising a hydroxylated aromatic; a solvent comprising a carboxylic acid; and an electrophilic linking agent. In another embodiment, the small pore area material is a low density microcellular material, the small pore area material comprising a hydroxylated aromatic; a solvent comprising a carboxylic acid selected from the group consisting of acetic acid, formic acid, propionic acid, butyric acid, pentanoic acid, and isomers thereof; and an electrophilic linking agent. In one embodiment, the small pore area material is a low density microcellular material, the small pore area material comprising a hydroxylated aromatic; a solvent comprising acetic acid; and an electrophilic linking agent.

In one embodiment, the small pore area material is a low density microcellular material, the small pore area material comprising a hydroxylated aromatic, wherein the hydroxylated aromatic is a hydroxylated benzene compound; a solvent comprising a carboxylic acid; and an electrophilic linking agent. In another embodiment, the small pore area material is a low density microcellular material, the small pore area material comprising a hydroxylated aromatic, wherein the hydroxylated aromatic comprises a phenolic-novolak resin or phenolic-resole resin; a solvent comprising a carboxylic acid; and an electrophilic linking agent. In another embodiment, the small pore area material is a low density microcellular material, the small pore area material comprising a hydroxylated aromatic, wherein the hydroxylated aromatic is selected from the group consisting of phenol, resorcinol, catechol, hydroquinone, phloroglucinol and liquid phenolic resins; a solvent comprising a carboxylic acid; and an electrophilic linking agent.

In one embodiment, the small pore area material is a low density microcellular material, the small pore area material comprising a hydroxylated aromatic; a solvent comprising a carboxylic acid; and an electrophilic linking agent, wherein the electrophilic linking agent comprises an aldehyde. In another embodiment, the small pore area material is a low density microcellular material, the small pore area material comprising a hydroxylated aromatic; a solvent comprising a carboxylic acid; and an electrophilic linking agent, wherein the electrophilic linking agent comprises furfural. In another embodiment, the small pore area material is a low density microcellular material, the small pore area material comprising a hydroxylated aromatic; a solvent comprising a carboxylic acid; and an electrophilic linking agent, wherein the electrophilic linking agent comprises alcohol. In another embodiment, the small pore area material is a low density microcellular material, the small pore area material comprising a hydroxylated aromatic; a solvent comprising a carboxylic acid; and an electrophilic linking agent, wherein the electrophilic linking agent comprises furfuryl alcohol. In another embodiment, the small pore area material is a low density microcellular material, the small pore area material comprising a hydroxylated aromatic; a solvent comprising a carboxylic acid; and an electrophilic linking agent, wherein the electrophilic linking agent is selected from the group consisting of formaldehyde, 1,3,5 trioxane, and paraformaldehyde.

In one embodiment, the small pore area material is an aerogel. In another embodiment, the small pore area material is an aerogel comprising a hydroxylated aromatic; a solvent comprising a carboxylic acid; and an electrophilic linking agent. In another embodiment, the small pore area material is an aerogel comprising a hydroxylated aromatic; a solvent comprising a carboxylic acid selected from the group consisting of acetic acid, formic acid, propionic acid, butyric acid, pentanoic acid, and isomers thereof; and an electrophilic linking agent. In one embodiment, the small pore area material is an aerogel comprising a hydroxylated aromatic; a solvent comprising acetic acid; and an electrophilic linking agent.

In one embodiment, the small pore area material is an aerogel comprising a hydroxylated aromatic, wherein the hydroxylated aromatic is a hydroxylated benzene compound; a solvent comprising a carboxylic acid; and an electrophilic linking agent. In another embodiment, the small pore area material is an aerogel comprising a hydroxylated aromatic, wherein the hydroxylated aromatic comprises a phenolic-novolak resin or phenolic-resole resin; a solvent comprising a carboxylic acid; and an electrophilic linking agent. In another embodiment, the small pore area material is an aerogel comprising a hydroxylated aromatic, wherein the hydroxylated aromatic is selected from the group consisting of phenol, resorcinol, catechol, hydroquinone, phloroglucinol and liquid phenolic resins; a solvent comprising a carboxylic acid; and an electrophilic linking agent.

In one embodiment, the small pore area material is an aerogel comprising a hydroxylated aromatic; a solvent comprising a carboxylic acid; and an electrophilic linking agent, wherein the electrophilic linking agent comprises an aldehyde. In another embodiment, the small pore area material is an aerogel comprising a hydroxylated aromatic; a solvent comprising a carboxylic acid; and an electrophilic linking agent, wherein the electrophilic linking agent comprises furfural. In another embodiment, the small pore area material is an aerogel comprising a hydroxylated aromatic; a solvent comprising a carboxylic acid; and an electrophilic linking agent, wherein the electrophilic linking agent comprises alcohol. In another embodiment, the small pore area material is an aerogel comprising a hydroxylated aromatic; a solvent comprising a carboxylic acid; and an electrophilic linking agent, wherein the electrophilic linking agent comprises furfuryl alcohol. In another embodiment, the small pore area material is an aerogel comprising a hydroxylated aromatic; a solvent comprising a carboxylic acid; and an electrophilic linking agent, wherein the electrophilic linking agent is selected from the group consisting of formaldehyde, 1,3,5 trioxane, and paraformaldehyde.

In another embodiment, the aerogel comprises novolak resin, furfural and acetic acid.

In one embodiment, the composites described herein further comprise an agent selected from the group consisting of metal powders, metal oxides, metal salts, silica, alumina, aluminosilicates, carbon black, novoloid fibers and fire resistant additives.

In one embodiment, the composite comprises an open cell foam comprising phenol-aldehyde; and a small pore area material comprising a hydroxylated aromatic; a solvent comprising a carboxylic acid; and an electrophilic linking agent. In another embodiment, the composite comprises an open cell foam comprising a high density open-celled phenol-aldehyde foam; and a small pore area material comprising a hydroxylated aromatic; a solvent comprising a carboxylic acid; and an electrophilic linking agent. In another embodiment, the composite comprises an open cell foam comprising a phenol-formaldehyde foam; and a small pore area material comprising a hydroxylated aromatic; a solvent comprising a carboxylic acid; and an electrophilic linking agent. In another embodiment, the composite comprises an open cell foam comprising a high density open-celled phenol-formaldehyde foam; and a small pore area material comprising a hydroxylated aromatic; a solvent comprising a carboxylic acid; and an electrophilic linking agent. In another embodiment, the composite comprises an open cell foam comprising phenol-aldehyde; and a small pore area material comprising a hydroxylated aromatic; a solvent comprising a carboxylic acid selected from the group consisting of acetic acid, formic acid, propionic acid, butyric acid, pentanoic acid, and isomers thereof; and an electrophilic linking agent. In one embodiment, the composite comprises an open cell foam comprising phenol-aldehyde; and a small pore area material comprising a hydroxylated aromatic; a solvent comprising acetic acid; and an electrophilic linking agent.

In one embodiment, the composite comprises an open cell foam comprising phenol-aldehyde; and a small pore area material comprising a hydroxylated aromatic, wherein the hydroxylated aromatic is a hydroxylated benzene compound; a solvent comprising a carboxylic acid; and an electrophilic linking agent. In another embodiment, the composite comprises an open cell foam comprising phenol-aldehyde; and a small pore area material comprising a hydroxylated aromatic, wherein the hydroxylated aromatic comprises a phenolic-novolak resin or phenolic-resole resin; a solvent comprising a carboxylic acid; and an electrophilic linking agent. In another embodiment, the composite comprises an open cell foam comprising phenol-aldehyde; and a small pore area material comprising a hydroxylated aromatic, wherein the hydroxylated aromatic is selected from the group consisting of phenol, resorcinol, catechol, hydroquinone, phloroglucinol and liquid phenolic resins; a solvent comprising a carboxylic acid; and an electrophilic linking agent.

In one embodiment, the composite comprises an open cell foam comprising phenol-aldehyde; and a small pore area material comprising a hydroxylated aromatic; a solvent comprising a carboxylic acid; and an electrophilic linking agent, wherein the electrophilic linking agent comprises an aldehyde. In another embodiment, the composite comprises an open cell foam comprising phenol-aldehyde; and a small pore area material comprising a hydroxylated aromatic; a solvent comprising a carboxylic acid; and an electrophilic linking agent, wherein the electrophilic linking agent comprises furfural. In another embodiment, the composite comprises an open cell foam comprising phenol-aldehyde; and a small pore area material comprising a hydroxylated aromatic; a solvent comprising a carboxylic acid; and an electrophilic linking agent, wherein the electrophilic linking agent comprises alcohol. In another embodiment, the composite comprises an open cell foam comprising phenol-aldehyde; and a small pore area material comprising a hydroxylated aromatic; a solvent comprising a carboxylic acid; and an electrophilic linking agent, wherein the electrophilic linking agent comprises furfuryl alcohol. In another embodiment, the composite comprises an open cell foam comprising phenol-aldehyde; and a small pore area material comprising a hydroxylated aromatic; a solvent comprising a carboxylic acid; and an electrophilic linking agent, wherein the electrophilic linking agent is selected from the group consisting of formaldehyde, 1,3,5 trioxane, and paraformaldehyde.

In another embodiment, the composite comprises an open cell foam comprising phenol-aldehyde; and a small pore area material, wherein the small pore area material is a low density microcellular material. In another embodiment, the composite comprises an open cell foam comprising phenol-aldehyde; and a small pore area material, wherein the small pore area material is a low density microcellular material comprising a hydroxylated aromatic; a solvent comprising a carboxylic acid; and an electrophilic linking agent. In another embodiment, the composite comprises an open cell foam comprising phenol-aldehyde; and a small pore area material, wherein the small pore area material is a low density microcellular material comprising a hydroxylated aromatic; a solvent comprising a carboxylic acid selected from the group consisting of acetic acid, formic acid, propionic acid, butyric acid, pentanoic acid, and isomers thereof; and an electrophilic linking agent. In one embodiment the composite comprises an open cell foam comprising phenol-aldehyde; and a small pore area material, wherein the small pore area material is a low density microcellular material comprising a hydroxylated aromatic; a solvent comprising acetic acid; and an electrophilic linking agent.

In one embodiment, the composite comprises an open cell foam comprising phenol-aldehyde; and a small pore area material, wherein the small pore area material is a low density microcellular material comprising a hydroxylated aromatic, wherein the hydroxylated aromatic is a hydroxylated benzene compound; a solvent comprising a carboxylic acid; and an electrophilic linking agent. In another embodiment, the composite comprises an open cell foam comprising phenol-aldehyde; and a small pore area material, wherein the small pore area material is a low density microcellular material comprising a hydroxylated aromatic, wherein the hydroxylated aromatic comprises a phenolic-novolak resin or phenolic-resole resin; a solvent comprising a carboxylic acid; and an electrophilic linking agent. In another embodiment, the composite comprises an open cell foam comprising phenol-aldehyde; and a small pore area material, wherein the small pore area material is a low density microcellular material comprising a hydroxylated aromatic, wherein the hydroxylated aromatic is selected from the group consisting of phenol, resorcinol, catechol, hydroquinone, phloroglucinol and liquid phenolic resins; a solvent comprising a carboxylic acid; and an electrophilic linking agent.

In one embodiment, the composite comprises an open cell foam comprising phenol-aldehyde; and a small pore area material, wherein the small pore area material is a low density microcellular material comprising a hydroxylated aromatic; a solvent comprising a carboxylic acid; and an electrophilic linking agent, wherein the electrophilic linking agent comprises an aldehyde. In another embodiment, the composite comprises an open cell foam comprising phenol-aldehyde; and a small pore area material, wherein the small pore area material is a low density microcellular material comprising a hydroxylated aromatic; a solvent comprising a carboxylic acid; and an electrophilic linking agent, wherein the electrophilic linking agent comprises furfural. In another embodiment, the composite comprises an open cell foam comprising phenol-aldehyde; and a small pore area material, wherein the small pore area material is a low density microcellular material comprising a hydroxylated aromatic; a solvent comprising a carboxylic acid; and an electrophilic linking agent, wherein the electrophilic linking agent comprises alcohol. In another embodiment, the composite comprises an open cell foam comprising phenol-aldehyde; and a small pore area material, wherein the small pore area material is a low density microcellular material comprising a hydroxylated aromatic; a solvent comprising a carboxylic acid; and an electrophilic linking agent, wherein the electrophilic linking agent comprises furfuryl alcohol. In another embodiment, the composite comprises an open cell foam comprising phenol-aldehyde; and a small pore area material, wherein the small pore area material is a low density microcellular material comprising a hydroxylated aromatic; a solvent comprising a carboxylic acid; and an electrophilic linking agent, wherein the electrophilic linking agent is selected from the group consisting of formaldehyde, 1,3,5 trioxane, and paraformaldehyde.

In one embodiment, the composite comprises an open cell foam comprising polyethylene or polypropylene; and a small pore area material comprising a hydroxylated aromatic; a solvent comprising a carboxylic acid; and an electrophilic linking agent. In another embodiment, the composite comprises an open cell foam comprising polyethylene or polypropylene; and a small pore area material comprising a hydroxylated aromatic; a solvent comprising a carboxylic acid selected from the group consisting of acetic acid, formic acid, propionic acid, butyric acid, pentanoic acid, and isomers thereof; and an electrophilic linking agent. In one embodiment, the composite comprises an open cell foam comprising polyethylene or polypropylene; and a small pore area material comprising a hydroxylated aromatic; a solvent comprising acetic acid; and an electrophilic linking agent.

In one embodiment, the composite comprises an open cell foam comprising polyethylene or polypropylene; and a small pore area material comprising a hydroxylated aromatic, wherein the hydroxylated aromatic is a hydroxylated benzene compound; a solvent comprising a carboxylic acid; and an electrophilic linking agent. In another embodiment, the composite comprises an open cell foam comprising polyethylene or polypropylene; and a small pore area material comprising a hydroxylated aromatic, wherein the hydroxylated aromatic comprises a phenolic-novolak resin or phenolic-resole resin; a solvent comprising a carboxylic acid; and an electrophilic linking agent. In another embodiment, the composite comprises an open cell foam comprising polyethylene or polypropylene; and a small pore area material comprising a hydroxylated aromatic, wherein the hydroxylated aromatic is selected from the group consisting of phenol, resorcinol, catechol, hydroquinone, phloroglucinol and liquid phenolic resins; a solvent comprising a carboxylic acid; and an electrophilic linking agent.

In one embodiment, the composite comprises an open cell foam comprising polyethylene or polypropylene; and a small pore area material comprising a hydroxylated aromatic; a solvent comprising a carboxylic acid; and an electrophilic linking agent, wherein the electrophilic linking agent comprises an aldehyde. In another embodiment, the composite comprises an open cell foam comprising polyethylene or polypropylene; and a small pore area material comprising a hydroxylated aromatic; a solvent comprising a carboxylic acid; and an electrophilic linking agent, wherein the electrophilic linking agent comprises furfural. In another embodiment, the composite comprises an open cell foam comprising polyethylene or polypropylene; and a small pore area material comprising a hydroxylated aromatic; a solvent comprising a carboxylic acid; and an electrophilic linking agent, wherein the electrophilic linking agent comprises alcohol. In another embodiment, the composite comprises an open cell foam comprising polyethylene or polypropylene; and a small pore area material comprising a hydroxylated aromatic; a solvent comprising a carboxylic acid; and an electrophilic linking agent, wherein the electrophilic linking agent comprises furfuryl alcohol. In another embodiment, the composite comprises an open cell foam comprising polyethylene or polypropylene; and a small pore area material comprising a hydroxylated aromatic; a solvent comprising a carboxylic acid; and an electrophilic linking agent, wherein the electrophilic linking agent is selected from the group consisting of formaldehyde, 1,3,5 trioxane, and paraformaldehyde.

In another embodiment, the composite comprises an open cell foam comprising polyethylene or polypropylene; and a small pore area material, wherein the small pore area material is a low density microcellular material. In another embodiment, the composite comprises an open cell foam comprising polyethylene or polypropylene; and a small pore area material, wherein the small pore area material is a low density microcellular material comprising a hydroxylated aromatic; a solvent comprising a carboxylic acid; and an electrophilic linking agent. In another embodiment, the composite comprises an open cell foam comprising polyethylene or polypropylene; and a small pore area material, wherein the small pore area material is a low density microcellular material comprising a hydroxylated aromatic; a solvent comprising a carboxylic acid selected from the group consisting of acetic acid, formic acid, propionic acid, butyric acid, pentanoic acid, and isomers thereof; and an electrophilic linking agent. In one embodiment the composite comprises an open cell foam comprising polyethylene or polypropylene; and a small pore area material, wherein the small pore area material is a low density microcellular material comprising a hydroxylated aromatic; a solvent comprising acetic acid; and an electrophilic linking agent.

In one embodiment, the composite comprises an open cell foam comprising polyethylene or polypropylene; and a small pore area material, wherein the small pore area material is a low density microcellular material comprising a hydroxylated aromatic, wherein the hydroxylated aromatic is a hydroxylated benzene compound; a solvent comprising a carboxylic acid; and an electrophilic linking agent. In another embodiment, the composite comprises an open cell foam comprising polyethylene or polypropylene; and a small pore area material, wherein the small pore area material is a low density microcellular material comprising a hydroxylated aromatic, wherein the hydroxylated aromatic comprises a phenolic-novolak resin or phenolic-resole resin; a solvent comprising a carboxylic acid; and an electrophilic linking agent. In another embodiment, the composite comprises an open cell foam comprising polyethylene or polypropylene; and a small pore area material, wherein the small pore area material is a low density microcellular material comprising a hydroxylated aromatic, wherein the hydroxylated aromatic is selected from the group consisting of phenol, resorcinol, catechol, hydroquinone, phloroglucinol and liquid phenolic resins; a solvent comprising a carboxylic acid; and an electrophilic linking agent.

In one embodiment, the composite comprises an open cell foam comprising polyethylene or polypropylene; and a small pore area material, wherein the small pore area material is a low density microcellular material comprising a hydroxylated aromatic; a solvent comprising a carboxylic acid; and an electrophilic linking agent, wherein the electrophilic linking agent comprises an aldehyde. In another embodiment, the composite comprises an open cell foam comprising polyethylene or polypropylene; and a small pore area material, wherein the small pore area material is a low density microcellular material comprising a hydroxylated aromatic; a solvent comprising a carboxylic acid; and an electrophilic linking agent, wherein the electrophilic linking agent comprises furfural. In another embodiment, the composite comprises an open cell foam comprising polyethylene or polypropylene; and a small pore area material, wherein the small pore area material is a low density microcellular material comprising a hydroxylated aromatic; a solvent comprising a carboxylic acid; and an electrophilic linking agent, wherein the electrophilic linking agent comprises alcohol. In another embodiment, the composite comprises an open cell foam comprising polyethylene or polypropylene; and a small pore area material, wherein the small pore area material is a low density microcellular material comprising a hydroxylated aromatic; a solvent comprising a carboxylic acid; and an electrophilic linking agent, wherein the electrophilic linking agent comprises furfuryl alcohol. In another embodiment, the composite comprises an open cell foam comprising polyethylene or polypropylene; and a small pore area material, wherein the small pore area material is a low density microcellular material comprising a hydroxylated aromatic; a solvent comprising a carboxylic acid; and an electrophilic linking agent, wherein the electrophilic linking agent is selected from the group consisting of formaldehyde, 1,3,5 trioxane, and paraformaldehyde.

In one embodiment, the composite comprises an open cell foam comprising phenol-aldehyde and a strengthening agent; and a small pore area material comprising a hydroxylated aromatic; a solvent comprising a carboxylic acid; and an electrophilic linking agent. In another embodiment, the composite comprises an open cell foam comprising a high density open-celled phenol-aldehyde foam and a strengthening agent; and a small pore area material comprising a hydroxylated aromatic; a solvent comprising a carboxylic acid; and an electrophilic linking agent. In another embodiment, the composite comprises an open cell foam comprising a phenol-formaldehyde foam and a strengthening agent; and a small pore area material comprising a hydroxylated aromatic; a solvent comprising a carboxylic acid; and an electrophilic linking agent. In another embodiment, the composite comprises an open cell foam comprising a high density open-celled phenol-formaldehyde foam and a strengthening agent; and a small pore area material comprising a hydroxylated aromatic; a solvent comprising a carboxylic acid; and an electrophilic linking agent. In another embodiment, the composite comprises an open cell foam comprising phenol-aldehyde and a strengthening agent; and a small pore area material comprising a hydroxylated aromatic; a solvent comprising a carboxylic acid selected from the group consisting of acetic acid, formic acid, propionic acid, butyric acid, pentanoic acid, and isomers thereof; and an electrophilic linking agent. In one embodiment, the composite comprises an open cell foam comprising phenol-aldehyde and a strengthening agent; and a small pore area material comprising a hydroxylated aromatic; a solvent comprising acetic acid; and an electrophilic linking agent.

In one embodiment, the composite comprises an open cell foam comprising phenol-aldehyde and a strengthening agent; and a small pore area material comprising a hydroxylated aromatic, wherein the hydroxylated aromatic is a hydroxylated benzene compound; a solvent comprising a carboxylic acid; and an electrophilic linking agent. In another embodiment, the composite comprises an open cell foam comprising phenol-aldehyde and a strengthening agent; and a small pore area material comprising a hydroxylated aromatic, wherein the hydroxylated aromatic comprises a phenolic-novolak resin or phenolic-resole resin; a solvent comprising a carboxylic acid; and an electrophilic linking agent. In another embodiment, the composite comprises an open cell foam comprising phenol-aldehyde and a strengthening agent; and a small pore area material comprising a hydroxylated aromatic, wherein the hydroxylated aromatic is selected from the group consisting of phenol, resorcinol, catechol, hydroquinone, phloroglucinol and liquid phenolic resins; a solvent comprising a carboxylic acid; and an electrophilic linking agent.

In one embodiment, the composite comprises an open cell foam comprising phenol-aldehyde and a strengthening agent; and a small pore area material comprising a hydroxylated aromatic; a solvent comprising a carboxylic acid; and an electrophilic linking agent, wherein the electrophilic linking agent comprises an aldehyde. In another embodiment, the composite comprises an open cell foam comprising phenol-aldehyde and a strengthening agent; and a small pore area material comprising a hydroxylated aromatic; a solvent comprising a carboxylic acid; and an electrophilic linking agent, wherein the electrophilic linking agent comprises furfural. In another embodiment, the composite comprises an open cell foam comprising phenol-aldehyde and a strengthening agent; and a small pore area material comprising a hydroxylated aromatic; a solvent comprising a carboxylic acid; and an electrophilic linking agent, wherein the electrophilic linking agent comprises alcohol. In another embodiment, the composite comprises an open cell foam comprising phenol-aldehyde and a strengthening agent; and a small pore area material comprising a hydroxylated aromatic; a solvent comprising a carboxylic acid; and an electrophilic linking agent, wherein the electrophilic linking agent comprises furfuryl alcohol. In another embodiment, the composite comprises an open cell foam comprising phenol-aldehyde and a strengthening agent; and a small pore area material comprising a hydroxylated aromatic; a solvent comprising a carboxylic acid; and an electrophilic linking agent, wherein the electrophilic linking agent is selected from the group consisting of formaldehyde, 1,3,5 trioxane, and paraformaldehyde.

In another embodiment, the composite comprises an open cell foam comprising phenol-aldehyde and a strengthening agent; and a small pore area material, wherein the small pore area material is a low density microcellular material. In another embodiment, the composite comprises an open cell foam comprising phenol-aldehyde and a strengthening agent; and a small pore area material, wherein the small pore area material is a low density micro cellular material comprising a hydroxylated aromatic; a solvent comprising a carboxylic acid; and an electrophilic linking agent. In another embodiment, the composite comprises an open cell foam comprising phenol-aldehyde and a strengthening agent; and a small pore area material, wherein the small pore area material is a low density microcellular material comprising a hydroxylated aromatic; a solvent comprising a carboxylic acid selected from the group consisting of acetic acid, formic acid, propionic acid, butyric acid, pentanoic acid, and isomers thereof; and an electrophilic linking agent. In one embodiment the composite comprises an open cell foam comprising phenol-aldehyde and a strengthening agent; and a small pore area material, wherein the small pore area material is a low density microcellular material comprising a hydroxylated aromatic; a solvent comprising acetic acid; and an electrophilic linking agent.

In one embodiment, the composite comprises an open cell foam comprising phenol-aldehyde and a strengthening agent; and a small pore area material, wherein the small pore area material is a low density microcellular material comprising a hydroxylated aromatic, wherein the hydroxylated aromatic is a hydroxylated benzene compound; a solvent comprising a carboxylic acid; and an electrophilic linking agent. In another embodiment, the composite comprises an open cell foam comprising phenol-aldehyde and a strengthening agent; and a small pore area material, wherein the small pore area material is a low density microcellular material comprising a hydroxylated aromatic, wherein the hydroxylated aromatic comprises a phenolic-novolak resin or phenolic-resole resin; a solvent comprising a carboxylic acid; and an electrophilic linking agent. In another embodiment, the composite comprises an open cell foam comprising phenol-aldehyde and a strengthening agent; and a small pore area material, wherein the small pore area material is a low density microcellular material comprising a hydroxylated aromatic, wherein the hydroxylated aromatic is selected from the group consisting of phenol, resorcinol, catechol, hydroquinone, phloroglucinol and liquid phenolic resins; a solvent comprising a carboxylic acid; and an electrophilic linking agent.

In one embodiment, the composite comprises an open cell foam comprising phenol-aldehyde and a strengthening agent; and a small pore area material, wherein the small pore area material is a low density microcellular material comprising a hydroxylated aromatic; a solvent comprising a carboxylic acid; and an electrophilic linking agent, wherein the electrophilic linking agent comprises an aldehyde. In another embodiment, the composite comprises an open cell foam comprising phenol-aldehyde and a strengthening agent; and a small pore area material, wherein the small pore area material is a low density micro cellular material comprising a hydroxylated aromatic; a solvent comprising a carboxylic acid; and an electrophilic linking agent, wherein the electrophilic linking agent comprises furfural. In another embodiment, the composite comprises an open cell foam comprising phenol-aldehyde and a strengthening agent; and a small pore area material, wherein the small pore area material is a low density microcellular material comprising a hydroxylated aromatic; a solvent comprising a carboxylic acid; and an electrophilic linking agent, wherein the electrophilic linking agent comprises alcohol. In another embodiment, the composite comprises an open cell foam comprising phenol-aldehyde and a strengthening agent; and a small pore area material, wherein the small pore area material is a low density microcellular material comprising a hydroxylated aromatic; a solvent comprising a carboxylic acid; and an electrophilic linking agent, wherein the electrophilic linking agent comprises furfuryl alcohol. In another embodiment, the composite comprises an open cell foam comprising phenol-aldehyde and a strengthening agent; and a small pore area material, wherein the small pore area material is a low density microcellular material comprising a hydroxylated aromatic; a solvent comprising a carboxylic acid; and an electrophilic linking agent, wherein the electrophilic linking agent is selected from the group consisting of formaldehyde, 1,3,5 trioxane, and paraformaldehyde.

In one embodiment, the composite comprises an open cell foam comprising polyethylene or polypropylene and a strengthening agent; and a small pore area material comprising a hydroxylated aromatic; a solvent comprising a carboxylic acid; and an electrophilic linking agent. In another embodiment, the composite comprises an open cell foam comprising polyethylene or polypropylene and a strengthening agent; and a small pore area material comprising a hydroxylated aromatic; a solvent comprising a carboxylic acid selected from the group consisting of acetic acid, formic acid, propionic acid, butyric acid, pentanoic acid, and isomers thereof; and an electrophilic linking agent. In one embodiment, the composite comprises an open cell foam comprising polyethylene or polypropylene and a strengthening agent; and a small pore area material comprising a hydroxylated aromatic; a solvent comprising a carboxylic acid, wherein the carboxylic acid is acetic acid; and an electrophilic linking agent.

In one embodiment, the composite comprises an open cell foam comprising polyethylene or polypropylene and a strengthening agent; and a small pore area material comprising a hydroxylated aromatic, wherein the hydroxylated aromatic is a hydroxylated benzene compound; a solvent comprising a carboxylic acid; and an electrophilic linking agent. In another embodiment, the composite comprises an open cell foam comprising polyethylene or polypropylene and a strengthening agent; and a small pore area material comprising a hydroxylated aromatic, wherein the hydroxylated aromatic comprises a phenolic-novolak resin or phenolic-resole resin; a solvent comprising a carboxylic acid; and an electrophilic linking agent. In another embodiment, the composite comprises an open cell foam comprising polyethylene or polypropylene and a strengthening agent; and a small pore area material comprising a hydroxylated aromatic, wherein the hydroxylated aromatic is selected from the group consisting of phenol, resorcinol, catechol, hydroquinone, phloroglucinol and liquid phenolic resins; a solvent comprising a carboxylic acid; and an electrophilic linking agent.

In one embodiment, the composite comprises an open cell foam comprising polyethylene or polypropylene and a strengthening agent; and a small pore area material comprising a hydroxylated aromatic; a solvent comprising a carboxylic acid; and an electrophilic linking agent, wherein the electrophilic linking agent comprises an aldehyde. In another embodiment, the composite comprises an open cell foam comprising polyethylene or polypropylene and a strengthening agent; and a small pore area material comprising a hydroxylated aromatic; a solvent comprising a carboxylic acid; and an electrophilic linking agent, wherein the electrophilic linking agent comprises furfural. In another embodiment, the composite comprises an open cell foam comprising polyethylene or polypropylene and a strengthening agent; and a small pore area material comprising a hydroxylated aromatic; a solvent comprising a carboxylic acid; and an electrophilic linking agent, wherein the electrophilic linking agent comprises alcohol. In another embodiment, the composite comprises an open cell foam comprising polyethylene or polypropylene and a strengthening agent; and a small pore area material comprising a hydroxylated aromatic; a solvent comprising a carboxylic acid; and an electrophilic linking agent, wherein the electrophilic linking agent comprises furfuryl alcohol. In another embodiment, the composite comprises an open cell foam comprising polyethylene or polypropylene and a strengthening agent; and a small pore area material comprising a hydroxylated aromatic; a solvent comprising a carboxylic acid; and an electrophilic linking agent, wherein the electrophilic linking agent is selected from the group consisting of formaldehyde, 1,3,5 trioxane, and paraformaldehyde.

In another embodiment, the composite comprises an open cell foam comprising polyethylene or polypropylene and a strengthening agent; and a small pore area material, wherein the small pore area material is a low density microcellular material. In another embodiment, the composite comprises an open cell foam comprising polyethylene or polypropylene and a strengthening agent; and a small pore area material, wherein the small pore area material is a low density microcellular material comprising a hydroxylated aromatic; a solvent comprising a carboxylic acid; and an electrophilic linking agent. In another embodiment, the composite comprises an open cell foam comprising polyethylene or polypropylene and a strengthening agent; and a small pore area material, wherein the small pore area material is a low density microcellular material comprising a hydroxylated aromatic; a solvent comprising a carboxylic acid selected from the group consisting of acetic acid, formic acid, propionic acid, butyric acid, pentanoic acid, and isomers thereof; and an electrophilic linking agent. In one embodiment the composite comprises an open cell foam comprising polyethylene or polypropylene and a strengthening agent; and a small pore area material, wherein the small pore area material is a low density microcellular material comprising a hydroxylated aromatic; a solvent comprising acetic acid; and an electrophilic linking agent.

In one embodiment, the composite comprises an open cell foam comprising polyethylene or polypropylene and a strengthening agent; and a small pore area material, wherein the small pore area material is a low density microcellular material comprising a hydroxylated aromatic, wherein the hydroxylated aromatic is a hydroxylated benzene compound; a solvent comprising a carboxylic acid; and an electrophilic linking agent. In another embodiment, the composite comprises an open cell foam comprising polyethylene or polypropylene and a strengthening agent; and a small pore area material, wherein the small pore area material is a low density microcellular material comprising a hydroxylated aromatic, wherein the hydroxylated aromatic comprises a phenolic-novolak resin or phenolic-resole resin; a solvent comprising a carboxylic acid; and an electrophilic linking agent. In another embodiment, the composite comprises an open cell foam comprising polyethylene or polypropylene and a strengthening agent; and a small pore area material, wherein the small pore area material is a low density microcellular material comprising a hydroxylated aromatic, wherein the hydroxylated aromatic is selected from the group consisting of phenol, resorcinol, catechol, hydroquinone, phloroglucinol and liquid phenolic resins; a solvent comprising a carboxylic acid; and an electrophilic linking agent.

In one embodiment, the composite comprises an open cell foam comprising polyethylene or polypropylene and a strengthening agent; and a small pore area material, wherein the small pore area material is a low density microcellular material comprising a hydroxylated aromatic; a solvent comprising a carboxylic acid; and an electrophilic linking agent, wherein the electrophilic linking agent comprises an aldehyde. In another embodiment, the composite comprises an open cell foam comprising polyethylene or polypropylene and a strengthening agent; and a small pore area material, wherein the small pore area material is a low density microcellular material comprising a hydroxylated aromatic; a solvent comprising a carboxylic acid; and an electrophilic linking agent, wherein the electrophilic linking agent comprises furfural. In another embodiment, the composite comprises an open cell foam comprising polyethylene or polypropylene and a strengthening agent; and a small pore area material, wherein the small pore area material is a low density microcellular material comprising a hydroxylated aromatic; a solvent comprising a carboxylic acid; and an electrophilic linking agent, wherein the electrophilic linking agent comprises alcohol. In another embodiment, the composite comprises an open cell foam comprising polyethylene or polypropylene and a strengthening agent; and a small pore area material, wherein the small pore area material is a low density microcellular material comprising a hydroxylated aromatic; a solvent comprising a carboxylic acid; and an electrophilic linking agent, wherein the electrophilic linking agent comprises furfuryl alcohol. In another embodiment, the composite comprises an open cell foam comprising polyethylene or polypropylene and a strengthening agent; and a small pore area material, wherein the small pore area material is a low density microcellular material comprising a hydroxylated aromatic; a solvent comprising a carboxylic acid; and an electrophilic linking agent, wherein the electrophilic linking agent is selected from the group consisting of formaldehyde, 1,3,5 trioxane, and paraformaldehyde.

In one embodiment, the composite comprises an open cell foam comprising phenol-aldehyde and an infrared opacifier; and a small pore area material comprising a hydroxylated aromatic; a solvent comprising a carboxylic acid; and an electrophilic linking agent. In another embodiment, the composite comprises an open cell foam comprising a high density open-celled phenol-aldehyde foam and an infrared opacifier; and a small pore area material comprising a hydroxylated aromatic; a solvent comprising a carboxylic acid; and an electrophilic linking agent. In another embodiment, the composite comprises an open cell foam comprising a phenol-formaldehyde foam and an infrared opacifier; and a small pore area material comprising a hydroxylated aromatic; a solvent comprising a carboxylic acid; and an electrophilic linking agent. In another embodiment, the composite comprises an open cell foam comprising a high density open-celled phenol-formaldehyde foam and an infrared opacifier; and a small pore area material comprising a hydroxylated aromatic; a solvent comprising a carboxylic acid; and an electrophilic linking agent. In another embodiment, the composite comprises an open cell foam comprising phenol-aldehyde and an infrared opacifier; and a small pore area material comprising a hydroxylated aromatic; a solvent comprising a carboxylic acid selected from the group consisting of acetic acid, formic acid, propionic acid, butyric acid, pentanoic acid, and isomers thereof; and an electrophilic linking agent. In one embodiment, the composite comprises an open cell foam comprising phenol-aldehyde and an infrared opacifier; and a small pore area material comprising a hydroxylated aromatic; a solvent comprising acetic acid; and an electrophilic linking agent.

In one embodiment, the composite comprises an open cell foam comprising phenol-aldehyde and an infrared opacifier; and a small pore area material comprising a hydroxylated aromatic, wherein the hydroxylated aromatic is a hydroxylated benzene compound; a solvent comprising a carboxylic acid; and an electrophilic linking agent. In another embodiment, the composite comprises an open cell foam comprising phenol-aldehyde and an infrared opacifier; and a small pore area material comprising a hydroxylated aromatic, wherein the hydroxylated aromatic comprises a phenolic-novolak resin or phenolic-resole resin; a solvent comprising a carboxylic acid; and an electrophilic linking agent. In another embodiment, the composite comprises an open cell foam comprising phenol-aldehyde and an infrared opacifier; and a small pore area material comprising a hydroxylated aromatic, wherein the hydroxylated aromatic is selected from the group consisting of phenol, resorcinol, catechol, hydroquinone, phloroglucinol and liquid phenolic resins; a solvent comprising a carboxylic acid; and an electrophilic linking agent.

In one embodiment, the composite comprises an open cell foam comprising phenol-aldehyde and an infrared opacifier; and a small pore area material comprising a hydroxylated aromatic; a solvent comprising a carboxylic acid; and an electrophilic linking agent, wherein the electrophilic linking agent comprises an aldehyde. In another embodiment, the composite comprises an open cell foam comprising phenol-aldehyde and an infrared opacifier; and a small pore area material comprising a hydroxylated aromatic; a solvent comprising a carboxylic acid; and an electrophilic linking agent, wherein the electrophilic linking agent comprises furfural. In another embodiment, the composite comprises an open cell foam comprising phenol-aldehyde and an infrared opacifier; and a small pore area material comprising a hydroxylated aromatic; a solvent comprising a carboxylic acid; and an electrophilic linking agent, wherein the electrophilic linking agent comprises alcohol. In another embodiment, the composite comprises an open cell foam comprising phenol-aldehyde and an infrared opacifier; and a small pore area material comprising a hydroxylated aromatic; a solvent comprising a carboxylic acid; and an electrophilic linking agent, wherein the electrophilic linking agent comprises furfuryl alcohol. In another embodiment, the composite comprises an open cell foam comprising phenol-aldehyde and an infrared opacifier; and a small pore area material comprising a hydroxylated aromatic; a solvent comprising a carboxylic acid; and an electrophilic linking agent, wherein the electrophilic linking agent is selected from the group consisting of formaldehyde, 1,3,5 trioxane, and paraformaldehyde.

In another embodiment, the composite comprises an open cell foam comprising phenol-aldehyde and an infrared opacifier; and a small pore area material, wherein the small pore area material is a low density microcellular material. In another embodiment, the composite comprises an open cell foam comprising phenol-aldehyde and an infrared opacifier; and a small pore area material, wherein the small pore area material is a low density microcellular material comprising a hydroxylated aromatic; a solvent comprising a carboxylic acid; and an electrophilic linking agent. In another embodiment, the composite comprises an open cell foam comprising phenol-aldehyde and an infrared opacifier; and a small pore area material, wherein the small pore area material is a low density microcellular material comprising a hydroxylated aromatic; a solvent comprising a carboxylic acid selected from the group consisting of acetic acid, formic acid, propionic acid, butyric acid, pentanoic acid, and isomers thereof; and an electrophilic linking agent. In one embodiment the composite comprises an open cell foam comprising phenol-aldehyde and an infrared opacifier; and a small pore area material, wherein the small pore area material is a low density microcellular material comprising a hydroxylated aromatic; a solvent comprising acetic acid; and an electrophilic linking agent.

In one embodiment, the composite comprises an open cell foam comprising phenol-aldehyde and an infrared opacifier; and a small pore area material, wherein the small pore area material is a low density microcellular material comprising a hydroxylated aromatic, wherein the hydroxylated aromatic is a hydroxylated benzene compound; a solvent comprising a carboxylic acid; and an electrophilic linking agent. In another embodiment, the composite comprises an open cell foam comprising phenol-aldehyde and an infrared opacifier; and a small pore area material, wherein the small pore area material is a low density microcellular material comprising a hydroxylated aromatic, wherein the hydroxylated aromatic comprises a phenolic-novolak resin or phenolic-resole resin; a solvent comprising a carboxylic acid; and an electrophilic linking agent. In another embodiment, the composite comprises an open cell foam comprising phenol-aldehyde and an infrared opacifier; and a small pore area material, wherein the small pore area material is a low density microcellular material comprising a hydroxylated aromatic, wherein the hydroxylated aromatic is selected from the group consisting of phenol, resorcinol, catechol, hydroquinone, phloroglucinol and liquid phenolic resins; a solvent comprising a carboxylic acid; and an electrophilic linking agent.

In one embodiment, the composite comprises an open cell foam comprising phenol-aldehyde and an infrared opacifier; and a small pore area material, wherein the small pore area material is a low density microcellular material comprising a hydroxylated aromatic; a solvent comprising a carboxylic acid; and an electrophilic linking agent, wherein the electrophilic linking agent comprises an aldehyde. In another embodiment, the composite comprises an open cell foam comprising phenol-aldehyde and an infrared opacifier; and a small pore area material, wherein the small pore area material is a low density microcellular material comprising a hydroxylated aromatic; a solvent comprising a carboxylic acid; and an electrophilic linking agent, wherein the electrophilic linking agent comprises furfural. In another embodiment, the composite comprises an open cell foam comprising phenol-aldehyde and an infrared opacifier; and a small pore area material, wherein the small pore area material is a low density microcellular material comprising a hydroxylated aromatic; a solvent comprising a carboxylic acid; and an electrophilic linking agent, wherein the electrophilic linking agent comprises alcohol. In another embodiment, the composite comprises an open cell foam comprising phenol-aldehyde and an infrared opacifier; and a small pore area material, wherein the small pore area material is a low density microcellular material comprising a hydroxylated aromatic; a solvent comprising a carboxylic acid; and an electrophilic linking agent, wherein the electrophilic linking agent comprises furfuryl alcohol. In another embodiment, the composite comprises an open cell foam comprising phenol-aldehyde and an infrared opacifier; and a small pore area material, wherein the small pore area material is a low density microcellular material comprising a hydroxylated aromatic; a solvent comprising a carboxylic acid; and an electrophilic linking agent, wherein the electrophilic linking agent is selected from the group consisting of formaldehyde, 1,3,5 trioxane, and paraformaldehyde.

In one embodiment, the composite comprises an open cell foam comprising polyethylene or polypropylene and an infrared opacifier; and a small pore area material comprising a hydroxylated aromatic; a solvent comprising a carboxylic acid; and an electrophilic linking agent. In another embodiment, the composite comprises an open cell foam comprising polyethylene or polypropylene and an infrared opacifier; and a small pore area material comprising a hydroxylated aromatic; a solvent comprising a carboxylic acid selected from the group consisting of acetic acid, formic acid, propionic acid, butyric acid, pentanoic acid, and isomers thereof; and an electrophilic linking agent. In one embodiment, the composite comprises an open cell foam comprising polyethylene or polypropylene and an infrared opacifier; and a small pore area material comprising a hydroxylated aromatic; a solvent comprising acetic acid; and an electrophilic linking agent.

In one embodiment, the composite comprises an open cell foam comprising polyethylene or polypropylene and an infrared opacifier; and a small pore area material comprising a hydroxylated aromatic, wherein the hydroxylated aromatic is a hydroxylated benzene compound; a solvent comprising a carboxylic acid; and an electrophilic linking agent. In another embodiment, the composite comprises an open cell foam comprising polyethylene or polypropylene and an infrared opacifier; and a small pore area material comprising a hydroxylated aromatic, wherein the hydroxylated aromatic comprises a phenolic-novolak resin or phenolic-resole resin; a solvent comprising a carboxylic acid; and an electrophilic linking agent. In another embodiment, the composite comprises an open cell foam comprising polyethylene or polypropylene and an infrared opacifier; and a small pore area material comprising a hydroxylated aromatic, wherein the hydroxylated aromatic is selected from the group consisting of phenol, resorcinol, catechol, hydroquinone, phloroglucinol and liquid phenolic resins; a solvent comprising a carboxylic acid; and an electrophilic linking agent.

In one embodiment, the composite comprises an open cell foam comprising polyethylene or polypropylene and an infrared opacifier; and a small pore area material comprising a hydroxylated aromatic; a solvent comprising a carboxylic acid; and an electrophilic linking agent, wherein the electrophilic linking agent comprises an aldehyde. In another embodiment, the composite comprises an open cell foam comprising polyethylene or polypropylene and an infrared opacifier; and a small pore area material comprising a hydroxylated aromatic; a solvent comprising a carboxylic acid; and an electrophilic linking agent, wherein the electrophilic linking agent comprises furfural. In another embodiment, the composite comprises an open cell foam comprising polyethylene or polypropylene and an infrared opacifier; and a small pore area material comprising a hydroxylated aromatic; a solvent comprising a carboxylic acid; and an electrophilic linking agent, wherein the electrophilic linking agent comprises alcohol. In another embodiment, the composite comprises an open cell foam comprising polyethylene or polypropylene and an infrared opacifier; and a small pore area material comprising a hydroxylated aromatic; a solvent comprising a carboxylic acid; and an electrophilic linking agent, wherein the electrophilic linking agent comprises furfuryl alcohol. In another embodiment, the composite comprises an open cell foam comprising polyethylene or polypropylene and an infrared opacifier; and a small pore area material comprising a hydroxylated aromatic; a solvent comprising a carboxylic acid; and an electrophilic linking agent, wherein the electrophilic linking agent is selected from the group consisting of formaldehyde, 1,3,5 trioxane, and paraformaldehyde.

In another embodiment, the composite comprises an open cell foam comprising polyethylene or polypropylene and an infrared opacifier; and a small pore area material, wherein the small pore area material is a low density microcellular material. In another embodiment, the composite comprises an open cell foam comprising polyethylene or polypropylene and an infrared opacifier; and a small pore area material, wherein the small pore area material is a low density microcellular material comprising a hydroxylated aromatic; a solvent comprising a carboxylic acid; and an electrophilic linking agent. In another embodiment, the composite comprises an open cell foam comprising polyethylene or polypropylene and an infrared opacifier; and a small pore area material, wherein the small pore area material is a low density microcellular material comprising a hydroxylated aromatic; a solvent comprising a carboxylic acid selected from the group consisting of acetic acid, formic acid, propionic acid, butyric acid, pentanoic acid, and isomers thereof; and an electrophilic linking agent. In one embodiment the composite comprises an open cell foam comprising polyethylene or polypropylene and an infrared opacifier; and a small pore area material, wherein the small pore area material is a low density microcellular material comprising a hydroxylated aromatic; a solvent comprising a carboxylic acid, wherein the carboxylic acid is acetic acid; and an electrophilic linking agent.

In one embodiment, the composite comprises an open cell foam comprising polyethylene or polypropylene and an infrared opacifier; and a small pore area material, wherein the small pore area material is a low density microcellular material comprising a hydroxylated aromatic, wherein the hydroxylated aromatic is a hydroxylated benzene compound; a solvent comprising a carboxylic acid; and an electrophilic linking agent. In another embodiment, the composite comprises an open cell foam comprising polyethylene or polypropylene and an infrared opacifier; and a small pore area material, wherein the small pore area material is a low density microcellular material comprising a hydroxylated aromatic, wherein the hydroxylated aromatic comprises a phenolic-novolak resin or phenolic-resole resin; a solvent comprising a carboxylic acid; and an electrophilic linking agent. In another embodiment, the composite comprises an open cell foam comprising polyethylene or polypropylene and an infrared opacifier; and a small pore area material, wherein the small pore area material is a low density microcellular material comprising a hydroxylated aromatic, wherein the hydroxylated aromatic is selected from the group consisting of phenol, resorcinol, catechol, hydroquinone, phloroglucinol and liquid phenolic resins; a solvent comprising a carboxylic acid; and an electrophilic linking agent.

In one embodiment, the composite comprises an open cell foam comprising polyethylene or polypropylene and an infrared opacifier; and a small pore area material, wherein the small pore area material is a low density microcellular material comprising a hydroxylated aromatic; a solvent comprising a carboxylic acid; and an electrophilic linking agent, wherein the electrophilic linking agent comprises an aldehyde. In another embodiment, the composite comprises an open cell foam comprising polyethylene or polypropylene and an infrared opacifier; and a small pore area material, wherein the small pore area material is a low density microcellular material comprising a hydroxylated aromatic; a solvent comprising a carboxylic acid; and an electrophilic linking agent, wherein the electrophilic linking agent comprises furfural. In another embodiment, the composite comprises an open cell foam comprising polyethylene or polypropylene and an infrared opacifier; and a small pore area material, wherein the small pore area material is a low density microcellular material comprising a hydroxylated aromatic; a solvent comprising a carboxylic acid; and an electrophilic linking agent, wherein the electrophilic linking agent comprises alcohol. In another embodiment, the composite comprises an open cell foam comprising polyethylene or polypropylene and an infrared opacifier; and a small pore area material, wherein the small pore area material is a low density microcellular material comprising a hydroxylated aromatic; a solvent comprising a carboxylic acid; and an electrophilic linking agent, wherein the electrophilic linking agent comprises furfuryl alcohol. In another embodiment, the composite comprises an open cell foam comprising polyethylene or polypropylene and an infrared opacifier; and a small pore area material, wherein the small pore area material is a low density microcellular material comprising a hydroxylated aromatic; a solvent comprising a carboxylic acid; and an electrophilic linking agent, wherein the electrophilic linking agent is selected from the group consisting of formaldehyde, 1,3,5 trioxane, and paraformaldehyde.

In one embodiment, the composite comprises an open cell foam comprising phenol-aldehyde, carbon black and polyurethane; and a small pore area material comprising a hydroxylated aromatic; a solvent comprising a carboxylic acid; and an electrophilic linking agent. In another embodiment, the composite comprises an open cell foam comprising phenol-aldehyde, carbon black and polyurethane; and a small pore area material comprising a hydroxylated aromatic; a solvent comprising a carboxylic acid selected from the group consisting of acetic acid, formic acid, propionic acid, butyric acid, pentanoic acid, and isomers thereof; and an electrophilic linking agent. In one embodiment, the composite comprises an open cell foam comprising phenol-aldehyde, carbon black and polyurethane; and a small pore area material comprising a hydroxylated aromatic; a solvent comprising acetic acid; and an electrophilic linking agent.

In one embodiment, the composite comprises an open cell foam comprising phenol-aldehyde, carbon black and polyurethane; and a small pore area material comprising a hydroxylated aromatic, wherein the hydroxylated aromatic is a hydroxylated benzene compound; a solvent comprising a carboxylic acid; and an electrophilic linking agent. In another embodiment, the composite comprises an open cell foam comprising phenol-aldehyde, carbon black and polyurethane; and a small pore area material comprising a hydroxylated aromatic, wherein the hydroxylated aromatic comprises a phenolic-novolak resin or phenolic-resole resin; a solvent comprising a carboxylic acid; and an electrophilic linking agent. In another embodiment, the composite comprises an open cell foam comprising phenol-aldehyde, carbon black and polyurethane; and a small pore area material comprising a hydroxylated aromatic, wherein the hydroxylated aromatic is selected from the group consisting of phenol, resorcinol, catechol, hydroquinone, phloroglucinol and liquid phenolic resins; a solvent comprising a carboxylic acid; and an electrophilic linking agent.

In one embodiment, the composite comprises an open cell foam comprising phenol-aldehyde, carbon black and polyurethane; and a small pore area material comprising a hydroxylated aromatic; a solvent comprising a carboxylic acid; and an electrophilic linking agent, wherein the electrophilic linking agent comprises an aldehyde. In another embodiment, the composite comprises an open cell foam comprising phenol-aldehyde, carbon black and polyurethane; and a small pore area material comprising a hydroxylated aromatic; a solvent comprising a carboxylic acid; and an electrophilic linking agent, wherein the electrophilic linking agent comprises furfural. In another embodiment, the composite comprises an open cell foam comprising phenol-aldehyde, carbon black and polyurethane; and a small pore area material comprising a hydroxylated aromatic; a solvent comprising a carboxylic acid; and an electrophilic linking agent, wherein the electrophilic linking agent comprises alcohol. In another embodiment, the composite comprises an open cell foam comprising phenol-aldehyde, carbon black and polyurethane; and a small pore area material comprising a hydroxylated aromatic; a solvent comprising a carboxylic acid; and an electrophilic linking agent, wherein the electrophilic linking agent comprises furfuryl alcohol. In another embodiment, the composite comprises an open cell foam comprising phenol-aldehyde, carbon black and polyurethane r; and a small pore area material comprising a hydroxylated aromatic; a solvent comprising a carboxylic acid; and an electrophilic linking agent, wherein the electrophilic linking agent is selected from the group consisting of formaldehyde, 1,3,5 trioxane, and paraformaldehyde.

In another embodiment, the composite comprises an open cell foam comprising phenol-aldehyde, carbon black and polyurethane; and a small pore area material, wherein the small pore area material is a low density microcellular material. In another embodiment, the composite comprises an open cell foam comprising phenol-aldehyde, carbon black and polyurethane; and a small pore area material, wherein the small pore area material is a low density microcellular material comprising a hydroxylated aromatic; a solvent comprising a carboxylic acid; and an electrophilic linking agent. In another embodiment, the composite comprises an open cell foam comprising phenol-aldehyde, carbon black and polyurethane; and a small pore area material, wherein the small pore area material is a low density microcellular material comprising a hydroxylated aromatic; a solvent comprising a carboxylic acid selected from the group consisting of acetic acid, formic acid, propionic acid, butyric acid, pentanoic acid, and isomers thereof; and an electrophilic linking agent. In one embodiment the composite comprises an open cell foam comprising phenol-aldehyde, carbon black and polyurethane; and a small pore area material, wherein the small pore area material is a low density microcellular material comprising a hydroxylated aromatic; a solvent comprising acetic acid; and an electrophilic linking agent.

In one embodiment, the composite comprises an open cell foam comprising phenol-aldehyde, carbon black and polyurethane; and a small pore area material, wherein the small pore area material is a low density microcellular material comprising a hydroxylated aromatic, wherein the hydroxylated aromatic is a hydroxylated benzene compound; a solvent comprising a carboxylic acid; and an electrophilic linking agent. In another embodiment, the composite comprises an open cell foam comprising phenol-aldehyde, carbon black and polyurethane; and a small pore area material, wherein the small pore area material is a low density microcellular material comprising a hydroxylated aromatic, wherein the hydroxylated aromatic comprises a phenolic-novolak resin or phenolic-resole resin; a solvent comprising a carboxylic acid; and an electrophilic linking agent. In another embodiment, the composite comprises an open cell foam comprising phenol-aldehyde, carbon black and polyurethane; and a small pore area material, wherein the small pore area material is a low density microcellular material comprising a hydroxylated aromatic, wherein the hydroxylated aromatic is selected from the group consisting of phenol, resorcinol, catechol, hydroquinone, phloroglucinol and liquid phenolic resins; a solvent comprising a carboxylic acid; and an electrophilic linking agent.

In one embodiment, the composite comprises an open cell foam comprising phenol-aldehyde, carbon black and polyurethane; and a small pore area material, wherein the small pore area material is a low density microcellular material comprising a hydroxylated aromatic; a solvent comprising a carboxylic acid; and an electrophilic linking agent, wherein the electrophilic linking agent comprises an aldehyde. In another embodiment, the composite comprises an open cell foam comprising phenol-aldehyde, carbon black and polyurethane; and a small pore area material, wherein the small pore area material is a low density microcellular material comprising a hydroxylated aromatic; a solvent comprising a carboxylic acid; and an electrophilic linking agent, wherein the electrophilic linking agent comprises furfural. In another embodiment, the composite comprises an open cell foam comprising phenol-aldehyde, carbon black and polyurethane; and a small pore area material, wherein the small pore area material is a low density microcellular material comprising a hydroxylated aromatic; a solvent comprising a carboxylic acid; and an electrophilic linking agent, wherein the electrophilic linking agent comprises alcohol. In another embodiment, the composite comprises an open cell foam comprising phenol-aldehyde, carbon black and polyurethane; and a small pore area material, wherein the small pore area material is a low density microcellular material comprising a hydroxylated aromatic; a solvent comprising a carboxylic acid; and an electrophilic linking agent, wherein the electrophilic linking agent comprises furfuryl alcohol. In another embodiment, the composite comprises an open cell foam comprising phenol-aldehyde, carbon black and polyurethane; and a small pore area material, wherein the small pore area material is a low density microcellular material comprising a hydroxylated aromatic; a solvent comprising a carboxylic acid; and an electrophilic linking agent, wherein the electrophilic linking agent is selected from the group consisting of formaldehyde, 1,3,5 trioxane, and paraformaldehyde.

In one embodiment, the composite comprises an open cell foam comprising polyethylene or polypropylene, carbon black and polyurethane; and a small pore area material comprising a hydroxylated aromatic; a solvent comprising a carboxylic acid; and an electrophilic linking agent. In another embodiment, the composite comprises an open cell foam comprising polyethylene or polypropylene, carbon black and polyurethane; and a small pore area material comprising a hydroxylated aromatic; a solvent comprising a carboxylic acid selected from the group consisting of acetic acid, formic acid, propionic acid, butyric acid, pentanoic acid, and isomers thereof; and an electrophilic linking agent. In one embodiment, the composite comprises an open cell foam comprising polyethylene or polypropylene, carbon black and polyurethane; and a small pore area material comprising a hydroxylated aromatic; a solvent comprising acetic acid; and an electrophilic linking agent.

In one embodiment, the composite comprises an open cell foam comprising polyethylene or polypropylene, carbon black and polyurethane; and a small pore area material comprising a hydroxylated aromatic, wherein the hydroxylated aromatic is a hydroxylated benzene compound; a solvent comprising a carboxylic acid; and an electrophilic linking agent. In another embodiment, the composite comprises an open cell foam comprising polyethylene or polypropylene, carbon black and polyurethane; and a small pore area material comprising a hydroxylated aromatic, wherein the hydroxylated aromatic comprises a phenolic-novolak resin or phenolic-resole resin; a solvent comprising a carboxylic acid; and an electrophilic linking agent. In another embodiment, the composite comprises an open cell foam comprising polyethylene or polypropylene, carbon black and polyurethane; and a small pore area material comprising a hydroxylated aromatic, wherein the hydroxylated aromatic is selected from the group consisting of phenol, resorcinol, catechol, hydroquinone, phloroglucinol and liquid phenolic resins; a solvent comprising a carboxylic acid; and an electrophilic linking agent.

In one embodiment, the composite comprises an open cell foam comprising polyethylene or polypropylene, carbon black and polyurethane; and a small pore area material comprising a hydroxylated aromatic; a solvent comprising a carboxylic acid; and an electrophilic linking agent, wherein the electrophilic linking agent comprises an aldehyde. In another embodiment, the composite comprises an open cell foam comprising polyethylene or polypropylene, carbon black and polyurethane; and a small pore area material comprising a hydroxylated aromatic; a solvent comprising a carboxylic acid; and an electrophilic linking agent, wherein the electrophilic linking agent comprises furfural. In another embodiment, the composite comprises an open cell foam comprising polyethylene or polypropylene, carbon black and polyurethane; and a small pore area material comprising a hydroxylated aromatic; a solvent comprising a carboxylic acid; and an electrophilic linking agent, wherein the electrophilic linking agent comprises alcohol. In another embodiment, the composite comprises an open cell foam comprising polyethylene or polypropylene, carbon black and polyurethane; and a small pore area material comprising a hydroxylated aromatic; a solvent comprising a carboxylic acid; and an electrophilic linking agent, wherein the electrophilic linking agent comprises furfuryl alcohol. In another embodiment, the composite comprises an open cell foam comprising polyethylene or polypropylene, carbon black and polyurethane; and a small pore area material comprising a hydroxylated aromatic; a solvent comprising a carboxylic acid; and an electrophilic linking agent, wherein the electrophilic linking agent is selected from the group consisting of formaldehyde, 1,3,5 trioxane, and paraformaldehyde.

In another embodiment, the composite comprises an open cell foam comprising polyethylene or polypropylene, carbon black and polyurethane; and a small pore area material, wherein the small pore area material is a low density microcellular material. In another embodiment, the composite comprises an open cell foam comprising polyethylene or polypropylene, carbon black and polyurethane; and a small pore area material, wherein the small pore area material is a low density microcellular material comprising a hydroxylated aromatic; a solvent comprising a carboxylic acid; and an electrophilic linking agent. In another embodiment, the composite comprises an open cell foam comprising polyethylene or polypropylene, carbon black and polyurethane; and a small pore area material, wherein the small pore area material is a low density microcellular material comprising a hydroxylated aromatic; a solvent comprising a carboxylic acid selected from the group consisting of acetic acid, formic acid, propionic acid, butyric acid, pentanoic acid, and isomers thereof; and an electrophilic linking agent. In one embodiment the composite comprises an open cell foam comprising polyethylene or polypropylene, carbon black and polyurethane; and a small pore area material, wherein the small pore area material is a low density microcellular material comprising a hydroxylated aromatic; a solvent comprising a carboxylic acid, wherein the carboxylic acid is acetic acid; and an electrophilic linking agent.

In one embodiment, the composite comprises an open cell foam comprising polyethylene or polypropylene, carbon black and polyurethane; and a small pore area material, wherein the small pore area material is a low density microcellular material comprising a hydroxylated aromatic, wherein the hydroxylated aromatic is a hydroxylated benzene compound; a solvent comprising a carboxylic acid; and an electrophilic linking agent. In another embodiment, the composite comprises an open cell foam comprising polyethylene or polypropylene, carbon black and polyurethane; and a small pore area material, wherein the small pore area material is a low density microcellular material comprising a hydroxylated aromatic, wherein the hydroxylated aromatic comprises a phenolic-novolak resin or phenolic-resole resin; a solvent comprising a carboxylic acid; and an electrophilic linking agent. In another embodiment, the composite comprises an open cell foam comprising polyethylene or polypropylene, carbon black and polyurethane; and a small pore area material, wherein the small pore area material is a low density microcellular material comprising a hydroxylated aromatic, wherein the hydroxylated aromatic is selected from the group consisting of phenol, resorcinol, catechol, hydroquinone, phloroglucinol and liquid phenolic resins; a solvent comprising a carboxylic acid; and an electrophilic linking agent.

In one embodiment, the composite comprises an open cell foam comprising polyethylene or polypropylene, carbon black and polyurethane; and a small pore area material, wherein the small pore area material is a low density microcellular material comprising a hydroxylated aromatic; a solvent comprising a carboxylic acid; and an electrophilic linking agent, wherein the electrophilic linking agent comprises an aldehyde. In another embodiment, the composite comprises an open cell foam comprising polyethylene or polypropylene, carbon black and polyurethane; and a small pore area material, wherein the small pore area material is a low density microcellular material comprising a hydroxylated aromatic; a solvent comprising a carboxylic acid; and an electrophilic linking agent, wherein the electrophilic linking agent comprises furfural. In another embodiment, the composite comprises an open cell foam comprising polyethylene or polypropylene, carbon black and polyurethane; and a small pore area material, wherein the small pore area material is a low density microcellular material comprising a hydroxylated aromatic; a solvent comprising a carboxylic acid; and an electrophilic linking agent, wherein the electrophilic linking agent comprises alcohol. In another embodiment, the composite comprises an open cell foam comprising polyethylene or polypropylene, carbon black and polyurethane; and a small pore area material, wherein the small pore area material is a low density microcellular material comprising a hydroxylated aromatic; a solvent comprising a carboxylic acid; and an electrophilic linking agent, wherein the electrophilic linking agent comprises furfuryl alcohol. In another embodiment, the composite comprises an open cell foam comprising polyethylene or polypropylene, carbon black and polyurethane; and a small pore area material, wherein the small pore area material is a low density microcellular material comprising a hydroxylated aromatic; a solvent comprising a carboxylic acid; and an electrophilic linking agent, wherein the electrophilic linking agent is selected from the group consisting of formaldehyde, 1,3,5 trioxane, and paraformaldehyde.

In one embodiment, the composite comprises an open cell foam comprising phenol-aldehyde, a powdered pore area material and polyurethane; and a small pore area material comprising a hydroxylated aromatic; a solvent comprising a carboxylic acid; and an electrophilic linking agent. In another embodiment, the composite comprises an open cell foam comprising a high density open-celled phenol-aldehyde foam, a powdered pore area material and polyurethane; and a small pore area material comprising a hydroxylated aromatic; a solvent comprising a carboxylic acid; and an electrophilic linking agent. In another embodiment, the composite comprises an open cell foam comprising a phenol-formaldehyde foam, a powdered pore area material and polyurethane; and a small pore area material comprising a hydroxylated aromatic; a solvent comprising a carboxylic acid; and an electrophilic linking agent. In another embodiment, the composite comprises an open cell foam comprising a high density open-celled phenol-formaldehyde foam, a powdered pore area material and polyurethane; and a small pore area material comprising a hydroxylated aromatic; a solvent comprising a carboxylic acid; and an electrophilic linking agent. In another embodiment, the composite comprises an open cell foam comprising phenol-aldehyde, a powdered pore area material and polyurethane; and a small pore area material comprising a hydroxylated aromatic; a solvent comprising a carboxylic acid selected from the group consisting of acetic acid, formic acid, propionic acid, butyric acid, pentanoic acid, and isomers thereof; and an electrophilic linking agent. In one embodiment, the composite comprises an open cell foam comprising phenol-aldehyde, a powdered pore area material and polyurethane; and a small pore area material comprising a hydroxylated aromatic; a solvent comprising acetic acid; and an electrophilic linking agent.

In one embodiment, the composite comprises an open cell foam comprising phenol-aldehyde, a powdered pore area material and polyurethane; and a small pore area material comprising a hydroxylated aromatic, wherein the hydroxylated aromatic is a hydroxylated benzene compound; a solvent comprising a carboxylic acid; and an electrophilic linking agent. In another embodiment, the composite comprises an open cell foam comprising phenol-aldehyde, a powdered pore area material and polyurethane; and a small pore area material comprising a hydroxylated aromatic, wherein the hydroxylated aromatic comprises a phenolic-novolak resin or phenolic-resole resin; a solvent comprising a carboxylic acid; and an electrophilic linking agent. In another embodiment, the composite comprises an open cell foam comprising phenol-aldehyde, a powdered pore area material and polyurethane; and a small pore area material comprising a hydroxylated aromatic, wherein the hydroxylated aromatic is selected from the group consisting of phenol, resorcinol, catechol, hydroquinone, phloroglucinol and liquid phenolic resins; a solvent comprising a carboxylic acid; and an electrophilic linking agent.

In one embodiment, the composite comprises an open cell foam comprising phenol-aldehyde, a powdered pore area material and polyurethane; and a small pore area material comprising a hydroxylated aromatic; a solvent comprising a carboxylic acid; and an electrophilic linking agent, wherein the electrophilic linking agent comprises an aldehyde. In another embodiment, the composite comprises an open cell foam comprising phenol-aldehyde, a powdered pore area material and polyurethane; and a small pore area material comprising a hydroxylated aromatic; a solvent comprising a carboxylic acid; and an electrophilic linking agent, wherein the electrophilic linking agent comprises furfural. In another embodiment, the composite comprises an open cell foam comprising phenol-aldehyde, a powdered pore area material and polyurethane; and a small pore area material comprising a hydroxylated aromatic; a solvent comprising a carboxylic acid; and an electrophilic linking agent, wherein the electrophilic linking agent comprises alcohol. In another embodiment, the composite comprises an open cell foam comprising phenol-aldehyde, a powdered pore area material and polyurethane; and a small pore area material comprising a hydroxylated aromatic; a solvent comprising a carboxylic acid; and an electrophilic linking agent, wherein the electrophilic linking agent comprises furfuryl alcohol. In another embodiment, the composite comprises an open cell foam comprising phenol-aldehyde, a powdered pore area material and polyurethane; and a small pore area material comprising a hydroxylated aromatic; a solvent comprising a carboxylic acid; and an electrophilic linking agent, wherein the electrophilic linking agent is selected from the group consisting of formaldehyde, 1,3,5 trioxane, and paraformaldehyde.

In another embodiment, the composite comprises an open cell foam comprising phenol-aldehyde, a powdered pore area material and polyurethane; and a small pore area material, wherein the small pore area material is a low density microcellular material. In another embodiment, the composite comprises an open cell foam comprising phenol-aldehyde, a powdered pore area material and polyurethane; and a small pore area material, wherein the small pore area material is a low density microcellular material comprising a hydroxylated aromatic; a solvent comprising a carboxylic acid; and an electrophilic linking agent. In another embodiment, the composite comprises an open cell foam comprising phenol-aldehyde, a powdered pore area material and polyurethane; and a small pore area material, wherein the small pore area material is a low density microcellular material comprising a hydroxylated aromatic; a solvent comprising a carboxylic acid selected from the group consisting of acetic acid, formic acid, propionic acid, butyric acid, pentanoic acid, and isomers thereof; and an electrophilic linking agent. In one embodiment the composite comprises an open cell foam comprising phenol-aldehyde, powdered pore area material and polyurethane; and a small pore area material, wherein the small pore area material is a low density microcellular material comprising a hydroxylated aromatic; a solvent comprising acetic acid; and an electrophilic linking agent.

In one embodiment, the composite comprises an open cell foam comprising phenol-aldehyde, a powdered pore area material and polyurethane; and a small pore area material, wherein the small pore area material is a low density microcellular material comprising a hydroxylated aromatic, wherein the hydroxylated aromatic is a hydroxylated benzene compound; a solvent comprising a carboxylic acid; and an electrophilic linking agent. In another embodiment, the composite comprises an open cell foam comprising phenol-aldehyde, a powdered pore area material and polyurethane; and a small pore area material, wherein the small pore area material is a low density microcellular material comprising a hydroxylated aromatic, wherein the hydroxylated aromatic comprises a phenolic-novolak resin or phenolic-resole resin; a solvent comprising a carboxylic acid; and an electrophilic linking agent. In another embodiment, the composite comprises an open cell foam comprising phenol-aldehyde, a powdered pore area material and polyurethane; and a small pore area material, wherein the small pore area material is a low density microcellular material comprising a hydroxylated aromatic, wherein the hydroxylated aromatic is selected from the group consisting of phenol, resorcinol, catechol, hydroquinone, phloroglucinol and liquid phenolic resins; a solvent comprising a carboxylic acid; and an electrophilic linking agent.

In one embodiment, the composite comprises an open cell foam comprising phenol-aldehyde, a powdered pore area material and polyurethane; and a small pore area material, wherein the small pore area material is a low density microcellular material comprising a hydroxylated aromatic; a solvent comprising a carboxylic acid; and an electrophilic linking agent, wherein the electrophilic linking agent comprises an aldehyde. In another embodiment, the composite comprises an open cell foam comprising phenol-aldehyde, a powdered pore area material and polyurethane; and a small pore area material, wherein the small pore area material is a low density microcellular material comprising a hydroxylated aromatic; a solvent comprising a carboxylic acid; and an electrophilic linking agent, wherein the electrophilic linking agent comprises furfural. In another embodiment, the composite comprises an open cell foam comprising phenol-aldehyde, a powdered pore area material and polyurethane; and a small pore area material, wherein the small pore area material is a low density microcellular material comprising a hydroxylated aromatic; a solvent comprising a carboxylic acid; and an electrophilic linking agent, wherein the electrophilic linking agent comprises alcohol. In another embodiment, the composite comprises an open cell foam comprising phenol-aldehyde, a powdered pore area material and polyurethane; and a small pore area material, wherein the small pore area material is a low density microcellular material comprising a hydroxylated aromatic; a solvent comprising a carboxylic acid; and an electrophilic linking agent, wherein the electrophilic linking agent comprises furfuryl alcohol. In another embodiment, the composite comprises an open cell foam comprising phenol-aldehyde, a powdered pore area material and polyurethane; and a small pore area material, wherein the small pore area material is a low density microcellular material comprising a hydroxylated aromatic; a solvent comprising a carboxylic acid; and an electrophilic linking agent, wherein the electrophilic linking agent is selected from the group consisting of formaldehyde, 1,3,5 trioxane, and paraformaldehyde.

In one embodiment, the composite comprises an open cell foam comprising polyethylene or polypropylene, a powdered pore area material and polyurethane; and a small pore area material comprising a hydroxylated aromatic; a solvent comprising a carboxylic acid; and an electrophilic linking agent. In another embodiment, the composite comprises an open cell foam comprising polyethylene or polypropylene, a powdered pore area material and polyurethane; and a small pore area material comprising a hydroxylated aromatic; a solvent comprising a carboxylic acid selected from the group consisting of acetic acid, formic acid, propionic acid, butyric acid, pentanoic acid, and isomers thereof; and an electrophilic linking agent. In one embodiment, the composite comprises an open cell foam comprising polyethylene or polypropylene, a powdered pore area material and polyurethane; and a small pore area material comprising a hydroxylated aromatic; a solvent comprising acetic acid; and an electrophilic linking agent.

In one embodiment, the composite comprises an open cell foam comprising polyethylene or polypropylene, a powdered pore area material and polyurethane; and a small pore area material comprising a hydroxylated aromatic, wherein the hydroxylated aromatic is a hydroxylated benzene compound; a solvent comprising a carboxylic acid; and an electrophilic linking agent. In another embodiment, the composite comprises an open cell foam comprising polyethylene or polypropylene, a powdered pore area material and polyurethane; and a small pore area material comprising a hydroxylated aromatic, wherein the hydroxylated aromatic comprises a phenolic-novolak resin or phenolic-resole resin; a solvent comprising a carboxylic acid; and an electrophilic linking agent. In another embodiment, the composite comprises an open cell foam comprising polyethylene or polypropylene, a powdered pore area material and polyurethane; and a small pore area material comprising a hydroxylated aromatic, wherein the hydroxylated aromatic is selected from the group consisting of phenol, resorcinol, catechol, hydroquinone, phloroglucinol and liquid phenolic resins; a solvent comprising a carboxylic acid; and an electrophilic linking agent.

In one embodiment, the composite comprises an open cell foam comprising polyethylene or polypropylene, a powdered pore area material and polyurethane; and a small pore area material comprising a hydroxylated aromatic; a solvent comprising a carboxylic acid; and an electrophilic linking agent, wherein the electrophilic linking agent comprises an aldehyde. In another embodiment, the composite comprises an open cell foam comprising polyethylene or polypropylene, a powdered pore area material and polyurethane; and a small pore area material comprising a hydroxylated aromatic; a solvent comprising a carboxylic acid; and an electrophilic linking agent, wherein the electrophilic linking agent comprises furfural. In another embodiment, the composite comprises an open cell foam comprising polyethylene or polypropylene, a powdered pore area material and polyurethane; and a small pore area material comprising a hydroxylated aromatic; a solvent comprising a carboxylic acid; and an electrophilic linking agent, wherein the electrophilic linking agent comprises alcohol. In another embodiment, the composite comprises an open cell foam comprising polyethylene or polypropylene, a powdered pore area material and polyurethane; and a small pore area material comprising a hydroxylated aromatic; a solvent comprising a carboxylic acid; and an electrophilic linking agent, wherein the electrophilic linking agent comprises furfuryl alcohol. In another embodiment, the composite comprises an open cell foam comprising polyethylene or polypropylene, a powdered pore area material and polyurethane; and a small pore area material comprising a hydroxylated aromatic; a solvent comprising a carboxylic acid; and an electrophilic linking agent, wherein the electrophilic linking agent is selected from the group consisting of formaldehyde, 1,3,5 trioxane, and paraformaldehyde.

In another embodiment, the composite comprises an open cell foam comprising polyethylene or polypropylene, a powdered pore area material and polyurethane; and a small pore area material, wherein the small pore area material is a low density microcellular material. In another embodiment, the composite comprises an open cell foam comprising polyethylene or polypropylene, a powdered pore area material and polyurethane; and a small pore area material, wherein the small pore area material is a low density microcellular material comprising a hydroxylated aromatic; a solvent comprising a carboxylic acid; and an electrophilic linking agent. In another embodiment, the composite comprises an open cell foam comprising polyethylene or polypropylene, a powdered pore area material and polyurethane; and a small pore area material, wherein the small pore area material is a low density microcellular material comprising a hydroxylated aromatic; a solvent comprising a carboxylic acid selected from the group consisting of acetic acid, formic acid, propionic acid, butyric acid, pentanoic acid, and isomers thereof; and an electrophilic linking agent. In one embodiment the composite comprises an open cell foam comprising polyethylene or polypropylene, a powdered pore area material and polyurethane; and a small pore area material, wherein the small pore area material is a low density microcellular material comprising a hydroxylated aromatic; a solvent comprising acetic acid; and an electrophilic linking agent.

In one embodiment, the composite comprises an open cell foam comprising polyethylene or polypropylene, a powdered pore area material and polyurethane; and a small pore area material, wherein the small pore area material is a low density microcellular material comprising a hydroxylated aromatic, wherein the hydroxylated aromatic is a hydroxylated benzene compound; a solvent comprising a carboxylic acid; and an electrophilic linking agent. In another embodiment, the composite comprises an open cell foam comprising polyethylene or polypropylene, a powdered pore area material and polyurethane; and a small pore area material, wherein the small pore area material is a low density micro cellular material comprising a hydroxylated aromatic, wherein the hydroxylated aromatic comprises a phenolic-novolak resin or phenolic-resole resin; a solvent comprising a carboxylic acid; and an electrophilic linking agent. In another embodiment, the composite comprises an open cell foam comprising polyethylene or polypropylene, a powdered pore area material and polyurethane; and a small pore area material, wherein the small pore area material is a low density microcellular material comprising a hydroxylated aromatic, wherein the hydroxylated aromatic is selected from the group consisting of phenol, resorcinol, catechol, hydroquinone, phloroglucinol and liquid phenolic resins; a solvent comprising a carboxylic acid; and an electrophilic linking agent.

In one embodiment, the composite comprises an open cell foam comprising polyethylene or polypropylene, a powdered pore area material and polyurethane; and a small pore area material, wherein the small pore area material is a low density microcellular material comprising a hydroxylated aromatic; a solvent comprising a carboxylic acid; and an electrophilic linking agent, wherein the electrophilic linking agent comprises an aldehyde. In another embodiment, the composite comprises an open cell foam comprising polyethylene or polypropylene, a powdered pore area material and polyurethane; and a small pore area material, wherein the small pore area material is a low density microcellular material comprising a hydroxylated aromatic; a solvent comprising a carboxylic acid; and an electrophilic linking agent, wherein the electrophilic linking agent comprises furfural. In another embodiment, the composite comprises an open cell foam comprising polyethylene or polypropylene, a powdered pore area material and polyurethane; and a small pore area material, wherein the small pore area material is a low density microcellular material comprising a hydroxylated aromatic; a solvent comprising a carboxylic acid; and an electrophilic linking agent, wherein the electrophilic linking agent comprises alcohol. In another embodiment, the composite comprises an open cell foam comprising polyethylene or polypropylene, a powdered pore area material and polyurethane; and a small pore area material, wherein the small pore area material is a low density microcellular material comprising a hydroxylated aromatic; a solvent comprising a carboxylic acid; and an electrophilic linking agent, wherein the electrophilic linking agent comprises furfuryl alcohol. In another embodiment, the composite comprises an open cell foam comprising polyethylene or polypropylene, a powdered pore area material and polyurethane; and a small pore area material, wherein the small pore area material is a low density microcellular material comprising a hydroxylated aromatic; a solvent comprising a carboxylic acid; and an electrophilic linking agent, wherein the electrophilic linking agent is selected from the group consisting of formaldehyde, 1,3,5 trioxane, and paraformaldehyde.

In one embodiment, the composite comprises (a) a phenol-formaldehyde foam; and (b) an aerogel comprising novolak resin, furfural and acetic acid. In another embodiment, the composite comprises (a) a high density open-celled phenol-formaldehyde foam; and (b) an aerogel comprising novolak resin, furfural and acetic acid. In another embodiment, the composite comprises (a) a phenol-formaldehyde foam, (b) an aerogel comprising novolak resin, furfural and acetic acid, and (c) carbon black. In another embodiment, the composite comprises (a) a high density open-celled phenol-formaldehyde foam; (b) an aerogel comprising novolak resin, furfural and acetic acid; and (c) carbon black.

Methods of Preparing Composites of the Disclosure

The present disclosure provides method for preparing a composite comprising an open cell foam and a small pore area material. The method allows for the preparation of monoliths having lower density than expected for a given small pore area material, thus saving considerable amounts of money to produce the same volume of material. The method also allows for the preparation of monoliths having tailored aerogel densities otherwise unobtainable.

The method comprises (a) providing an open cell foam; (b) forming a solution comprising a hydroxylated aromatic, an electrophilic linking agent, and a carboxylic acid; (c) combining the solution from step (b) with the open cell foam; (d) allowing the solution to form a sol-gel; and (e) removing substantially all of the fluid portion of the sol-gel.

In step (a), an open cell foam is provided. The open cell foam can be any foam described in the preceding section. In one embodiment, the open cell foam comprises phenol-aldehyde. In another embodiment, the open cell foam comprises a high density open-celled phenol-aldehyde foam. In another embodiment, the open cell foam comprises a high density open-celled phenol-formaldehyde foam. In another embodiment, the open cell foam comprises a polymer selected from polyethylene or polypropylene. The provided open cell foam can be precut to a desired finished size and shape, or to a near finished size and shape.

In step (b), the precursor chemicals are mixed together to form a solution, as described in U.S. Pat. Nos. 7,005,181; 7,521,485; 8,071,657; and 8,436,061. In one embodiment, the small pore area material comprises a hydroxylated aromatic; a solvent comprising a carboxylic acid; and an electrophilic linking agent. In another embodiment, the small pore area material comprises a hydroxylated aromatic; a solvent comprising a carboxylic acid, wherein the carboxylic acid is selected from the group consisting of acetic acid, formic acid, propionic acid, butyric acid, pentanoic acid, and isomers thereof; and an electrophilic linking agent. In another embodiment, the small pore area material comprises a hydroxylated aromatic; a solvent comprising acetic acid; and an electrophilic linking agent. In another embodiment, the small pore area material comprises a hydroxylated aromatic, wherein the hydroxylated aromatic is a hydroxylated benzene compound; a solvent comprising a carboxylic acid; and an electrophilic linking agent. In another embodiment, the small pore area material comprises a hydroxylated aromatic, wherein the hydroxylated aromatic comprises a phenolic-novolak resin; a solvent comprising a carboxylic acid; and an electrophilic linking agent. In another embodiment, the small pore area material comprises a hydroxylated aromatic, wherein the hydroxylated aromatic is selected from the group consisting of phenol, resorcinol, catechol, hydroquinone, phloroglucinol and liquid phenolic resins; a solvent comprising a carboxylic acid; and an electrophilic linking agent. In another embodiment, the small pore area material comprises a hydroxylated aromatic; a solvent comprising a carboxylic acid; and an electrophilic linking agent, wherein the electrophilic linking agent comprises an aldehyde. In another embodiment, the small pore area material comprises a hydroxylated aromatic; a solvent comprising a carboxylic acid; and an electrophilic linking agent, wherein the electrophilic linking agent is selected from the group consisting of formaldehyde, 1,3,5 trioxane, and paraformaldehyde. In another embodiment, the small pore area material comprises a hydroxylated aromatic; a solvent comprising a carboxylic acid; and an electrophilic linking agent, wherein the electrophilic linking agent comprises alcohol. In another embodiment, the small pore area material comprises a hydroxylated aromatic; a solvent comprising a carboxylic acid; and an electrophilic linking agent, wherein the electrophilic linking agent is furfuryl alcohol. In another embodiment, the small pore area material comprises a hydroxylated aromatic; a solvent comprising a carboxylic acid; and an electrophilic linking agent, wherein the electrophilic linking agent comprises formaldehyde.

In one embodiment, the small pore area material is a low density microcellular material. In one embodiment, the small pore area material is a low density microcellular material comprising a hydroxylated aromatic; a solvent comprising a carboxylic acid; and an electrophilic linking agent. In another embodiment, the small pore area material is a low density microcellular material comprising a hydroxylated aromatic; a solvent comprising a carboxylic acid, wherein the carboxylic acid is selected from the group consisting of acetic acid, formic acid, propionic acid, butyric acid, pentanoic acid, and isomers thereof; and an electrophilic linking agent. In another embodiment, the small pore area material is a low density microcellular material comprising a hydroxylated aromatic; a solvent comprising acetic acid; and an electrophilic linking agent. In another embodiment, the small pore area material is a low density microcellular material comprising a hydroxylated aromatic, wherein the hydroxylated aromatic is a hydroxylated benzene compound; a solvent comprising a carboxylic acid; and an electrophilic linking agent. In another embodiment, the small pore area material is a low density microcellular material comprising a hydroxylated aromatic, wherein the hydroxylated aromatic comprises a phenolic-novolak resin; a solvent comprising a carboxylic acid; and an electrophilic linking agent. In another embodiment, the small pore area material is a low density microcellular material comprising a hydroxylated aromatic, wherein the hydroxylated aromatic is selected from the group consisting of phenol, resorcinol, catechol, hydroquinone, phloroglucinol and liquid phenolic resins; a solvent comprising a carboxylic acid; and an electrophilic linking agent. In another embodiment, the small pore area material is a low density microcellular material comprising a hydroxylated aromatic; a solvent comprising a carboxylic acid; and an electrophilic linking agent, wherein the electrophilic linking agent comprises an aldehyde. In another embodiment, the small pore area material is a low density microcellular material comprising a hydroxylated aromatic; a solvent comprising a carboxylic acid; and an electrophilic linking agent, wherein the electrophilic linking agent is selected from the group consisting of formaldehyde, 1,3,5 trioxane, and paraformaldehyde. In another embodiment, the small pore area material is a low density microcellular material comprising a hydroxylated aromatic; a solvent comprising a carboxylic acid; and an electrophilic linking agent, wherein the electrophilic linking agent comprises alcohol. In another embodiment, the small pore area material is a low density microcellular material comprising a hydroxylated aromatic; a solvent comprising a carboxylic acid; and an electrophilic linking agent, wherein the electrophilic linking agent is furfuryl alcohol. In another embodiment, the small pore area material is a low density microcellular material comprising a hydroxylated aromatic; a solvent comprising a carboxylic acid; and an electrophilic linking agent, wherein the electrophilic linking agent comprises formaldehyde.

The amount of each precursor compound present in the solution of step (b) can be varied to enhance particular properties of the final product, such as hardness, porosity, density, and the like. For example, increasing the amount of the hydroxylated aromatic and electrophilic linking agent typically results in higher density and harder product. The product volume is virtually fixed by the size of the open cell foam template, so typically higher density also yields smaller pores.

In one embodiment, the open cell foam in step (a) comprises phenol and the solution of step (b) comprises a hydroxylated aromatic; a solvent comprising a carboxylic acid; and an electrophilic linking agent. In another embodiment, the open cell foam comprises phenol and solution comprises a hydroxylated aromatic; a solvent comprising a carboxylic acid, wherein the carboxylic acid is selected from the group consisting of acetic acid, formic acid, propionic acid, butyric acid, pentanoic acid, and isomers thereof; and an electrophilic linking agent. In another embodiment, the open cell foam comprises phenol and the solution comprises a hydroxylated aromatic; a solvent comprising acetic acid; and an electrophilic linking agent. In another embodiment, the open cell foam comprises phenol and the solution comprises a hydroxylated aromatic, wherein the hydroxylated aromatic is a hydroxylated benzene compound; a solvent comprising a carboxylic acid; and an electrophilic linking agent. In another embodiment, the open cell foam comprises phenol and the solution comprises a hydroxylated aromatic, wherein the hydroxylated aromatic comprises a phenolic-novolak resin; a solvent comprising a carboxylic acid; and an electrophilic linking agent. In another embodiment, the open cell foam comprises phenol and the solution comprises a hydroxylated aromatic, wherein the hydroxylated aromatic is selected from the group consisting of phenol, resorcinol, catechol, hydroquinone, phloroglucinol and liquid phenolic resins; a solvent comprising a carboxylic acid; and an electrophilic linking agent. In another embodiment, the open cell foam comprises phenol and the solution comprises a hydroxylated aromatic; a solvent comprising a carboxylic acid; and an electrophilic linking agent, wherein the electrophilic linking agent comprises an aldehyde. In another embodiment, the open cell foam comprises phenol and the solution comprises a hydroxylated aromatic; a solvent comprising a carboxylic acid; and an electrophilic linking agent, wherein the electrophilic linking agent is selected from the group consisting of formaldehyde, 1,3,5 trioxane, and paraformaldehyde. In another embodiment, the open cell foam comprises phenol and the solution comprises a hydroxylated aromatic; a solvent comprising a carboxylic acid; and an electrophilic linking agent, wherein the electrophilic linking agent comprises alcohol. In another embodiment, the open cell foam comprises phenol and the solution comprises a hydroxylated aromatic; a solvent comprising a carboxylic acid; and an electrophilic linking agent, wherein the electrophilic linking agent is furfuryl alcohol. In another embodiment, the open cell foam comprises phenol and the solution comprises a hydroxylated aromatic; a solvent comprising a carboxylic acid; and an electrophilic linking agent, wherein the electrophilic linking agent comprises formaldehyde.

In another embodiment, the open cell foam in step (a) comprises a polymer selected from polyethylene or polypropylene and the solution of step (b) comprises a hydroxylated aromatic; a solvent comprising a carboxylic acid; and an electrophilic linking agent. In another embodiment, the open cell foam comprises polyethylene or polypropylene and the solution comprises a hydroxylated aromatic; a solvent comprising a carboxylic acid, wherein the carboxylic acid is selected from the group consisting of acetic acid, formic acid, propionic acid, butyric acid, pentanoic acid, and isomers thereof; and an electrophilic linking agent. In another embodiment, the open cell foam comprises polyethylene or polypropylene and the solution comprises a hydroxylated aromatic; a solvent comprising acetic acid; and an electrophilic linking agent. In another embodiment, the open cell foam comprises polyethylene or polypropylene and the solution comprises a hydroxylated aromatic, wherein the hydroxylated aromatic is a hydroxylated benzene compound; a solvent comprising a carboxylic acid; and an electrophilic linking agent. In another embodiment, the open cell foam comprises polyethylene or polypropylene and the solution comprises a hydroxylated aromatic, wherein the hydroxylated aromatic comprises a phenolic-novolak resin; a solvent comprising a carboxylic acid; and an electrophilic linking agent. In another embodiment, the open cell foam comprises polyethylene or polypropylene and the solution comprises a hydroxylated aromatic, wherein the hydroxylated aromatic is selected from the group consisting of phenol, resorcinol, catechol, hydroquinone, phloroglucinol and liquid phenolic resins; a solvent comprising a carboxylic acid; and an electrophilic linking agent. In another embodiment, the open cell foam comprises polyethylene or polypropylene and the solution comprises a hydroxylated aromatic; a solvent comprising a carboxylic acid; and an electrophilic linking agent, wherein the electrophilic linking agent comprises an aldehyde. In another embodiment, the open cell foam comprises polyethylene or polypropylene and the solution comprises a hydroxylated aromatic; a solvent comprising a carboxylic acid; and an electrophilic linking agent, wherein the electrophilic linking agent is selected from the group consisting of formaldehyde, 1,3,5 trioxane, and paraformaldehyde. In another embodiment, the open cell foam comprises polyethylene or polypropylene and the solution comprises a hydroxylated aromatic; a solvent comprising a carboxylic acid; and an electrophilic linking agent, wherein the electrophilic linking agent comprises alcohol. In another embodiment, the open cell foam comprises polyethylene or polypropylene and the solution comprises a hydroxylated aromatic; a solvent comprising a carboxylic acid; and an electrophilic linking agent, wherein the electrophilic linking agent is furfuryl alcohol. In another embodiment, the open cell foam comprises polyethylene or polypropylene and the solution comprises a hydroxylated aromatic; a solvent comprising a carboxylic acid; and an electrophilic linking agent, wherein the electrophilic linking agent comprises formaldehyde.

In one embodiment, the solution formed in step (b) further comprises a catalyzing agent. The catalyzing agent promotes polymerization and produces sol-gel formation at a rate consistent with or more rapid than other SPMs known in the art. See, e.g., U.S. Pat. Nos. 5,556,892 and 4,402,927. In one embodiment, the catalyzing agent is a hard acid having a pKa less than 1. In another embodiment, the catalyzing agent is selected from mineral acids, such as, but not limited to, hydrochloric acid, hydrobromic acid, sulfuric acid, and Lewis acids, such as, but not limited to, aluminum trichloride and boron trifluoride and commercially available catalysts having similar properties, for example, QUACORR 2001" catalyst (QO Chemicals, Inc., West Lafayette, Ind.). In another embodiment, the catalyzing agent is hydrochloric acid, hydrobromic acid or sulfuric acid. In general, increasing the amount of catalyzing agent substantially reduces the time required for gelation and/or curing. Increasing the amount of catalyst may also increase pore size.

In step (c), the solution from step (b) is combined with the open cell foam from step (a). In one embodiment, the combining step can be accomplished by pouring the solution over the open cell foam until the desired saturation is reached. In another embodiment, the combining step can be accomplished by dipping, spraying and the like. The amount of solution absorbed into the open cell foam varies based on the degree of open cell porosity, foam density and gel mix temperature. For example, an open cell foam having a low density typically has a high void volume and can absorb more liquid. A foam with significant closed cell character absorbs less liquid than one with more open cells. As the temperature of the gel mix increases, its density decreases. This limits the mass that can be absorbed into the template.

In step (d), the solution comprising a hydroxylated aromatic, an electrophilic linking agent, and a carboxylic acid is allowed to form a sol-gel. In one embodiment, the solution is maintained at an ambient pressure and a temperature between about 20° C. and about 100° C. In another embodiment, the solution is maintained at an ambient pressure and a temperature between about 40° C. and about 80° C. In one embodiment, step (d) includes the substep of subjecting said solution to either: (i) a temperature or a pressure higher than ambient; or (ii) a temperature and a pressure higher than ambient.

In step (e), substantially all of the fluid portion of the sol-gel is removed. The fluid may be removed by one or more of evaporative methods, centrifugation, applying a pressure differential across the sol-gel, freeze drying, vacuum purging/flushing using a low surface tension solvent and supercritical drying. In one embodiment, step (e) includes the substep of evaporating said fluid portion at ambient conditions. In another embodiment, step (e) further including the substep of subjecting said fluid portion to either: (i) higher than ambient temperatures or lower than ambient pressures; or (ii) higher than ambient temperatures and lower than ambient pressures. In another embodiment, step (e) is substantially accomplished by subjecting said sol-gel to centrifugation. In another embodiment, step (e) is substantially accomplished by subjecting said sol-gel to freeze drying. In another embodiment, step (e) is substantially accomplished by subjecting said sol-gel to a gas pressure differential across said sol-gel. In another embodiment, step (e) is substantially accomplished by supercritical extraction of said sol-gel.

Methods of Use

The composites of the disclosure can be used in insulation, in vacuum insulation, as sorbents, as catalytic supports, as filtration media, as starting materials for carbon production and as electronic and energy storage materials.

Articles of Manufacture

The present disclosure also provides an article of manufacture. In some embodiments, the article of manufacture comprises an open cell foam and a bag. The composite may be any open cell foam described herein. In other embodiments, the article of manufacture comprises a composite and a bag. The composite may be any composite described herein.

In another embodiment, the bag comprises a metalized layer. The metalized layer can be aluminum, silver, gold, chromium, nickel, platinum, silicon or titanium. In some embodiments, the metalized layer is aluminum. In some embodiments, the metalized layer is silver. In some embodiments, the metalized layer is gold. In some embodiments, the metalized layer is chromium. In some embodiments, the metalized layer is nickel. In some embodiments, the metalized layer is platinum. In some embodiments, the metalized layer is silicon. In some embodiments, the metalized layer is titanium.

In another embodiment, the bag comprises an oxide layer. The oxide layer can be silicon oxide, alumina, titanium dioxide, zirconium oxide, graphene oxide or silicon nitride. In some embodiments, oxide layer is silicon oxide. In some embodiments, oxide layer is alumina. In some embodiments, oxide layer is titanium dioxide. In some embodiments, oxide layer is zirconium oxide. In some embodiments, oxide layer is graphene oxide. In some embodiments, oxide layer is silicon nitride.

In some embodiments, the article of manufacture comprises substantially no air. In some embodiments, the article of manufacture comprises air at a concentration of less than about 100 mtorr. In some embodiments, the article of manufacture comprises air at a concentration of less than about 75 mtorr. In some embodiments, the article of manufacture comprises air at a concentration of less than about 50 mtorr.

In some embodiments, the article of manufacture comprises a low thermal conductivity gas. In some embodiments, the low thermal conductivity gas is one that has a thermal conductivity lower than air. In some embodiments, the low thermal conductivity gas has a thermal conductivity from about 1 mW/m K to about 20 mW/m K. In some embodiments, the low thermal conductivity gas has a thermal conductivity from about 1 mW/mK to about 10 mW/mK. In some embodiments, the low thermal conductivity gas has a thermal conductivity from about 1 mW/mK to about 8 mW/mK. In some embodiments, the low thermal conductivity gas is $SO_2$, Freon-12, xenon or Kr. In some embodiments, the low thermal conductivity gas is Freon-12. In some embodiments, the low thermal conductivity gas is Xe. In some embodiments, the low thermal conductivity gas is Kr. In some embodiments, the low thermal conductivity gas is $SO_2$.

The amount of low thermal conductivity gas present in the article of manufacture can be varied to improve the insulating properties of the article or improve performance over time. For example, backfilling an evacuated article of manufacture with a low thermal conductivity gas will dilute the higher thermal conductivity gasses, such that when re-evacuated the thermal insulating properties will be improved. Also, leaving additional low thermal conductivity gas pressure may help to reduce air and moisture permeation through the bag material.

In the article of manufactures according to this aspect of the disclosure, the foam may be any known open cell foam. However, the foam used must be a strong foam, or strengthened foam, to survive the evacuation procedure without collapsing. This is important for making high quality insulated boxes and containers.

In one embodiment, the article of manufacture comprises (a) a phenol-formaldehyde foam comprising carbon black and (b) a bag. In another embodiment, the article of manufacture comprises (a) a phenol-formaldehyde foam comprising carbon black and (b) a Mylar bag. In another embodiment, the article of manufacture comprises (a) a phenol-formaldehyde foam comprising carbon black, (b) a bag comprising a layer of aluminum and optionally an oxide layer comprising $SiO_2$ or $Al_2O_3$.

In one embodiment, the article of manufacture comprises (a) a phenol-formaldehyde foam, (b) an aerogel comprising novolak resin, furfural and acetic acid, and (c) a bag. In another embodiment, the article of manufacture comprises (a) a phenol-formaldehyde foam, (b) an aerogel comprising novolak resin, furfural and acetic acid, and (c) a Mylar bag. In another embodiment, the article of manufacture comprises (a) a phenol-formaldehyde foam, (b) an aerogel comprising novolak resin, furfural and acetic acid, and (c) a bag comprising a layer of aluminum and optionally an oxide layer comprising $SiO_2$ or $Al_2O_3$.

Methods of Preparing an Article of the Disclosure

The present disclosure also provides a method for preparing an article of manufacture. The method comprises placing any of the composites described herein inside a bag. In one embodiment, the method further comprises evacuating the bag; and sealing the bag. In another embodiment, the evacuating step comprises the substep of adding a low thermal conductivity gas to the bag.

The low thermal conductivity gas used in the method can be any known low thermal conductivity gas. In one embodiment, the low thermal conductivity gas is $SO_2$, Freon-12 or xenon.

In another embodiment, the evacuating step comprises the substep of re-evacuating the bag. In some embodiments, the evacuating step comprises adding a low thermal conductivity gas to the bag and re-evacuating the bag.

In one embodiment, the sealing step comprises heat sealing.

In one embodiment, the bag comprises PET, BOPP (biaxially oriented polypropylene), PVDC, LLDPE, HDPE or Nylon 11. In another embodiment, the bag comprises a laminate.

In one embodiment, the bag comprises a metalized layer. In another embodiment, the metalized layer comprises aluminum.

In one embodiment, the bag comprises an oxide layer. In another embodiment, the oxide layer comprises silicon dioxide.

In order that this invention be more fully understood, the following examples are set forth. These examples are for the purpose of illustration only and are not to be construed as limiting the scope of the invention in any way.

EXAMPLES

Example 1

Open cell phenolic foam was cut into 5, near-finished-shape pieces. Each piece weighed approximately 6.05 grams. Each piece can absorb 46 times its weight in gel mix. Table 1 shows the values of the individual components added (as a solution) for each piece. Five different samples were made, testing the effect of polymerization mix dilution. The dilution was made by reducing the active components by 0%, 10%, 20%, 50% and 90%, and making up the mass difference with acetic acid (AA). Components are in grams. Chemicals were mixed together, except HBr, until a homogeneous solution remained. HBr (48%) was added to each mix, thoroughly stirred and then added to the open celled foam. Once the foam had been completely saturated with the gel mix, they were then placed in a sealable container and allowed to cure at 80° C. for four hours. After curing they were then dried under vacuum (150 torr) at 100° C., until dry.

After the samples were dried, they were subjected to density and durometer measurements. Table 1 shows the results of these measurements.

TABLE 1

| No. | ID[1] | AA[2] | Resin[3] | Fur[4] | HBr[5] | Excess AA | Durometer | | | | Avg. | Density |
|---|---|---|---|---|---|---|---|---|---|---|---|---|
| 1 | 1 | 229.85 | 24.90 | 15.99 | 11.26 | 0 | 65 | 66 | 67 | 67 | 66.25 | 0.132 |
| 2 | 0.9 | 206.87 | 22.41 | 14.39 | 10.13 | 28.20 | 44 | 46 | 43 | 43 | 44 | 0.134 |
| 3 | 0.8 | 183.88 | 19.92 | 12.79 | 9.01 | 56.40 | 35 | 35 | 35 | 35 | 35 | 0.127 |
| 4 | 0.5 | 114.93 | 12.45 | 7.99 | 5.63 | 141.00 | 21 | 21 | 20 | 21 | 20.75 | 0.07 |
| 5 | 0.1 | 11.49 | 1.25 | 0.80 | 0.56 | 267.90 | 2 | 2 | 2 | 2 | 2 | <0.4 |

[1]ID denotes sample identifier.
[2]AA denotes acetic acid.
[3]Resin denotes novolak resin.
[4]Fur denotes furfural.
[5]HBr denotes hydrobromic acid.

As shown in Table 1, reducing the loading of the precursor solution (i.e., novolak resin, furfural, acetic acid and HBr) in the foam template produces a material with a lower density, albeit softer. Compare No. 1 to No. 4.

The samples were fabricated into vacuum insulation panels (VIPs) and subjected to effusivity measurements. Table 2 shows the results of those measurements.

TABLE 2

| No. | ID | Effusivity |
|---|---|---|
| 1 | 1 | 60.07 |
| 2 | 0.9 | 74.11 |
| 3 | 0.8 | 21.04 |
| 4 | 0.5 | 48.08 |
| 5 | 0.1 | N/A |

As shown in Table 2, favorable effusivities were obtained for Sample Nos. 1-4. Each of these materials can provide high end insulation. Sample No. 5 did not have the structural integrity necessary to make a VIP.

Example 2

Using the mix ID 1 from table 1, we scaled up the synthesis to larger bricks. Six samples were prepared in an identical manner. The gel mix was prepared as above with the final mix as following: acetic acid 2.047 kg, resin 0.210 kg, furfural 0.141 kg, 48% HBr 0.102 kg.

TABLE 3

| | No. | | | | | |
|---|---|---|---|---|---|---|
| | 1 | 2 | 3 | 4 | 5 | 6 |
| Durometer | 66 | 62 | 59 | 63 | 59 | 65 |
| Effusivity | 44.41 | 51.36 | 31.52 | 42.5 | 3.4 | 39.44 |
| Weight (g) | 86 | 82 | 73.1 | 67.1 | 66.1 | 68.7 |
| Size | 6.5 × 4.5 × 1 | 6.5 × 4.5 × 1 | 5 × 4.5 × 1 | 5 × 4.5 × 1 | 5 × 4.5 × 1 | 5 × 4.5 × 1 |
| Density (g/cm$^3$) | 0.1794 | 0.1711 | 0.1983 | 0.1820 | 0.1793 | 0.1863 |

As shown in Table 3, the method yields fairly reproducible results, providing composites with favorable effusivities.

While particular materials, formulations, operational sequences, process parameters, and end products have been set forth to describe and exemplify this invention, they are not intended to be limiting. Rather, it should be noted by those ordinarily skilled in the art that the written disclosures are exemplary only and that various other alternatives, adaptations, and modifications may be made within the scope of the present invention. Accordingly, the present invention is not limited to the specific embodiments illustrated herein, but is limited only by the following claims.

What is claimed is:

1. An evacuated composite comprising:
   (a) an open cell foam, wherein the open cell foam is floral foam; and
   (b) a small pore area material, wherein the small pore area material comprises the reaction product of a hydroxylated aromatic; a carboxylic acid; and an electrophilic linking agent;
   wherein the hydroxylated aromatic is a phenolic-novolak resin or phenolic-resole resin;
   the carboxylic acid is acetic acid; and
   the electrophilic linking is furfural or furfuryl alcohol.

2. The evacuated composite according to claim 1, wherein the open cell foam further comprises an opacifier.

3. The evacuated composite according to claim 1, further comprising an agent selected from the group consisting of metal powders, metal oxides, metal salts, silica, alumina, aluminosilicates, carbon black, novoloid fibers and fire resistant additives.

4. A method for preparing an article of manufacture, wherein the method comprises the step:
   (a) placing the evacuated composite of claim 1 inside a bag.

5. The method of claim 4, further comprising the steps:
   (b) evacuating the bag; and
   (c) sealing the bag.

6. The evacuated composite according to claim 1, wherein the hydroxylated aromatic is a phenolic-novolak resin.

7. The evacuated composite according to claim 1, wherein the electrophilic linking agent comprises furfural.

8. The evacuated composite according to claim 1, wherein the electrophilic linking agent comprises furfuryl alcohol.

9. The evacuated composite according to claim 1, wherein the composite comprises substantially no air.

10. The evacuated composite according to claim 1, wherein the composite comprises air at a concentration of less than about 100 mtorr.

11. The evacuated composite according to claim 1, wherein the composite comprises air at a concentration of less than about 50 mtorr.

12. An evacuated composite comprising (a) floral foam; and (b) a small pore area material comprising the reaction product of novolak resin, furfural and acetic acid.

13. The evacuated composite according to claim 1, wherein the hydroxylated aromatic is a phenolic-resole resin.

14. A method for preparing an evacuated composite comprising an open cell foam and a small pore area material, the method comprising:
   (a) providing an open cell foam, wherein the open cell foam is floral foam;
   (b) forming a solution comprising a hydroxylated aromatic, an electrophilic linking agent, and a carboxylic acid;
   (c) combining the solution from step (b) with the open cell foam;
   (d) allowing the solution to form a sol-gel;
   (e) removing substantially all of the fluid portion of the sol-gel; and
   (f) evacuating the composite.

15. The method according to claim 14, wherein the solution formed in step (b) further comprises a catalyzing agent.

16. The method according to claim 14, wherein step (d) includes the substep of subjecting said solution to either: (i) a temperature or a pressure higher than ambient; or (ii) a temperature and a pressure higher than ambient.

* * * * *